(12) United States Patent
Dahl et al.

(10) Patent No.: US 11,307,955 B2
(45) Date of Patent: Apr. 19, 2022

(54) GRAPHICAL USER INTERFACE AND ANALYSIS SYSTEM FOR DETERMINING PLATFORM STABILITY AND RESILIENCY

(71) Applicant: BANK OF AMERICA CORPORATION, Charlotte, NC (US)

(72) Inventors: Erik Dahl, Newark, DE (US); Beverly Ann Bonner, St. Augustine, FL (US); Robin Griffen Cobb, Virginia Beach, VA (US); Chris Keilitz, Chesapeake, VA (US); Benjamin Paul McQuay, Belmont, NC (US); Alexander Cameron Thomson, Basking Ridge, NJ (US); Gordon Matthew Woods, Norfolk, VA (US)

(73) Assignee: BANK OF AMERICA CORPORATION, Charlotte, NC (US)

(*) Notice: Subject to any disclaimer, the term of this patent is extended or adjusted under 35 U.S.C. 154(b) by 166 days.

(21) Appl. No.: 16/919,678

(22) Filed: Jul. 2, 2020

(65) Prior Publication Data
US 2022/0004477 A1  Jan. 6, 2022

(51) Int. Cl.
*G06F 11/34* (2006.01)
*G06F 11/30* (2006.01)
(52) U.S. Cl.
CPC ........ *G06F 11/3428* (2013.01); *G06F 11/302* (2013.01)

(58) Field of Classification Search
CPC .......................... G06F 11/302; G06F 11/3428
USPC ......................................................... 702/186
See application file for complete search history.

(56) References Cited

U.S. PATENT DOCUMENTS 10,296,305 B2 * 5/2019 Petri ....................... H04L 67/42
2020/0092334 A1 3/2020 Hiebert et al.

* cited by examiner

*Primary Examiner* — John H Le
(74) *Attorney, Agent, or Firm* — Moore & Van Allen PLLC; Nicholas C. Russell

(57) ABSTRACT

Embodiments of the invention are directed to a system, method, or computer program product structured for determining platform stability and resiliency. In some embodiments, the system is structured for, for each of a plurality of applications deployed or scheduled to be deployed on a platform, gathering data, evaluating stability factor(s), evaluating resiliency factor(s), determining an overall stability score for the application from the stability factor(s) and overall resiliency score for the application from the resiliency factor(s), and determining a data quality score and criticality score for the application from the stability factor(s) and resiliency factor(s); generating a first GUI including selectable filters; receiving a selection of at least one filter; identifying a subset of applications using the selected filter(s); determining an aggregated stability score, resiliency score, data quality score, and criticality score for the identified subset; and generating a second GUI including the aggregated scores.

20 Claims, 12 Drawing Sheets

Figure 10

Insights for Application #: XXX — 802

| Metric Type | Metric Definition | Test | Weight | Insights |
|---|---|---|---|---|
| CRITICALITY | CRITICALITY METRIC 1 | Test 1 | XX | No Action |
| CRITICALITY | CRITICALITY METRIC 2 | Test 2 | XX | No Action |
| CRITICALITY | CRITICALITY METRIC 3 | Test 3 | XXX | No Action |
| CRITICALITY | CRITICALITY METRIC 4 | Test 4 | XXX | No Action |
| RESILIENCY | RESILIENCY METRIC 1 | Test 5 | XX | Insight 1 |
| RESILIENCY | RESILIENCY METRIC 2 | Test 6 | XX | Insight 2 |
| RESILIENCY | RESILIENCY METRIC 3 | Test 7 | XX | Insight 3 |
| STABILITY | STABILITY METRIC 1 | Test 8 | XX | Insight 4 |
| STABILITY | STABILITY METRIC 2 | Test 9 | X | Insight 5 |

GRAPHICAL USER INTERFACE AND ANALYSIS SYSTEM FOR DETERMINING PLATFORM STABILITY AND RESILIENCY

BACKGROUND

An entity may operate a system that hosts one or more platforms. The platform(s) may be configured to perform one or more functions. In addition, applications may be created by developers and deployed on the platform(s) to increase the functionality of the platform(s). In some cases, the number of applications operating on or scheduled to operate on the platform(s) may be very large such that identifying the quality of the applications and underlying issues in the applications may be difficult for an individual. As such, there is a need for a system that could measure application quality and present that information to a user in an easy-to-understand format.

BRIEF SUMMARY

The following presents a simplified summary of one or more embodiments of the invention in order to provide a basic understanding of such embodiments. This summary is not an extensive overview of all contemplated embodiments and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address these and/or other needs by providing systems, computer program products, and methods for generation and validation of secure authentication codes. In some instances, the system comprises: a memory device with computer-readable program code stored thereon; a communication device; and a processing device operatively coupled to the memory device and communication device, wherein the processing device is configured to execute the computer-readable program code to: for each of a plurality of applications deployed or scheduled to be deployed on a platform that is configured to perform a plurality of functions: gather data relating to the application and operation of the application on the platform; evaluate one or more factors each indicating a level of stability of the application; evaluate one or more factors each indicating a level of resiliency of the application; determine an overall stability score for the application from the one or more stability factors and an overall resiliency score for the application from the one or more resiliency factors; and determine a data quality score and a criticality score for the application from the one or more stability factors and the one or more resiliency factors, wherein the data quality score measures a quality of the gathered data and the criticality score measures an importance of the application to the plurality of functions of the platform; generate a first graphical user interface including a plurality of selectable filters; receive a selection of at least one filter; identify a subset of the plurality of applications using the selected at least one filter; determine an aggregated stability score, an aggregated resiliency score, an aggregated data quality score, and an aggregated criticality score for the identified subset from the overall stability scores, overall resiliency scores, data quality scores, and criticality scores for the identified subset of applications; and generate a second graphical user interface including the aggregated stability score, aggregated resiliency score, aggregated data quality score, and aggregated criticality score.

In some embodiments, or in combination with any of the previous embodiments, the second graphical user interface further includes a list with an entry for each application of the identified subset, the entry for a given application including the overall stability score, overall resiliency score, data quality score, and criticality score for the application, and the invention is further configured to: receive a selection of an application from the list; and generate a third graphical user interface including: a breakdown of at least one of the overall stability score, overall resiliency score, data quality score, or criticality score for the selected application; and one or more recommended actions for improving at least one of the overall stability score, overall resiliency score, data quality score, or criticality score for the selected application.

In some embodiments, or in combination with any of the previous embodiments, evaluating the one or more stability factors comprises: evaluating one or more factors each indicating a level of historical stability of the application based on past operation incidents for the application; evaluating one or more factors each indicating a level of criticality of the application to the plurality of functions of the platform; and evaluating one or more factors each indicating a level of supportability of the application.

In some embodiments, or in combination with any of the previous embodiments, evaluating the one or more stability factors comprises: evaluating one or more factors each indicating a level of historical stability of the application based on past operation incidents for the application; evaluating one or more factors each indicating a level of criticality of the application to the plurality of functions of the platform; and evaluating one or more factors each indicating a level of supportability of the application.

In some embodiments, or in combination with any of the previous embodiments, evaluating the one or more resiliency factors comprises: evaluating one or more factors each indicating a level of ability for operation incident prevention for the application; evaluating one or more factors each indicating a level of ability for operation incident detection for the application; and evaluating one or more factors each indicating a level of ability for operation incident recovery for the application.

In some embodiments, or in combination with any of the previous embodiments, the invention is further configured to: determine the overall stability score by determining, using the one or more stability factors, whether the application meets each of a plurality of stability criteria, wherein each stability criterion is associated with a weighted value, and using the weighted values of the met stability criteria to generate the overall stability score; determine the overall resiliency score by determining, using the one or more resiliency factors, whether the application meets each of a plurality of resiliency criteria, wherein each resiliency criterion is associated with a weighted value, and using the weighted values of the met resiliency criteria to generate the overall resiliency score; determine the data quality score by determining, using the one or more stability factors and the one or more resiliency factors, whether the application meets each of a plurality of data quality criteria, wherein each data quality criterion is associated with a weighted value, and using the weighted values of the met data quality criteria to generate the data quality score; and determine the criticality score by determining, using the one or more stability factors and the one or more resiliency factors, whether the application meets each of a plurality of criticality criteria, wherein each criticality criterion is associated with a weighted value, and using the weighted values of the met criticality criteria to generate the criticality score.

In some embodiments, or in combination with any of the previous embodiments, the invention is further configured to: receive a selection of one of the plurality of applications; and generate a fourth graphical user interface including: the met stability criteria, the met resiliency criteria, the met data quality criteria, and the met criticality criteria; and one or more recommended actions for improving at least one of the overall stability score, overall resiliency score, data quality score, or criticality score based on at least one of the met stability criteria, met resiliency criteria, met data quality criteria, or met criticality criteria.

In some embodiments, or in combination with any of the previous embodiments, the aggregated stability score is a mean or a median of the total overall stability scores for the identified subset of applications; the aggregated resiliency score is a mean or a median of the total overall resiliency scores for the identified subset of applications; the aggregated data quality score is a mean or a median of the total data quality scores for the identified subset of applications; and the aggregated data quality score is a mean or a median of the total criticality scores for the identified subset of applications.

In some embodiments, or in combination with any of the previous embodiments, the second graphical user interface further includes a first meter showing a strength of the aggregated stability score compared to a total possible stability score, a second meter showing a strength of an aggregated resiliency score compared to a total possible resiliency score, and a third meter showing a strength of the data quality score compared to a total possible data quality score.

In some embodiments, or in combination with any of the previous embodiments, the second graphical user interface further includes a graph charting aggregated operation incidents for the identified subset of applications over a period of time.

In some embodiments, or in combination with any of the previous embodiments, the second graphical user interface further includes a graph charting a portion of the identified subset of applications with low overall stability scores and low overall resiliency scores, a portion of the identified subset of applications with low overall stability scores and high overall resiliency scores, a portion of the identified subset of applications with high overall stability scores and low overall resiliency scores, and a portion of the identified subset of applications with high overall stability scores and high overall resiliency scores.

In some embodiments, or in combination with any of the previous embodiments, the invention is further configured to predict a future operation failure for an application of the plurality of applications from the one or more stability factors and one or more resiliency factors for the application.

In some embodiments, or in combination with any of the previous embodiments, the invention is further configured to predict a future supportability issue for an application of the plurality of applications from the one or more stability factors for the application.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
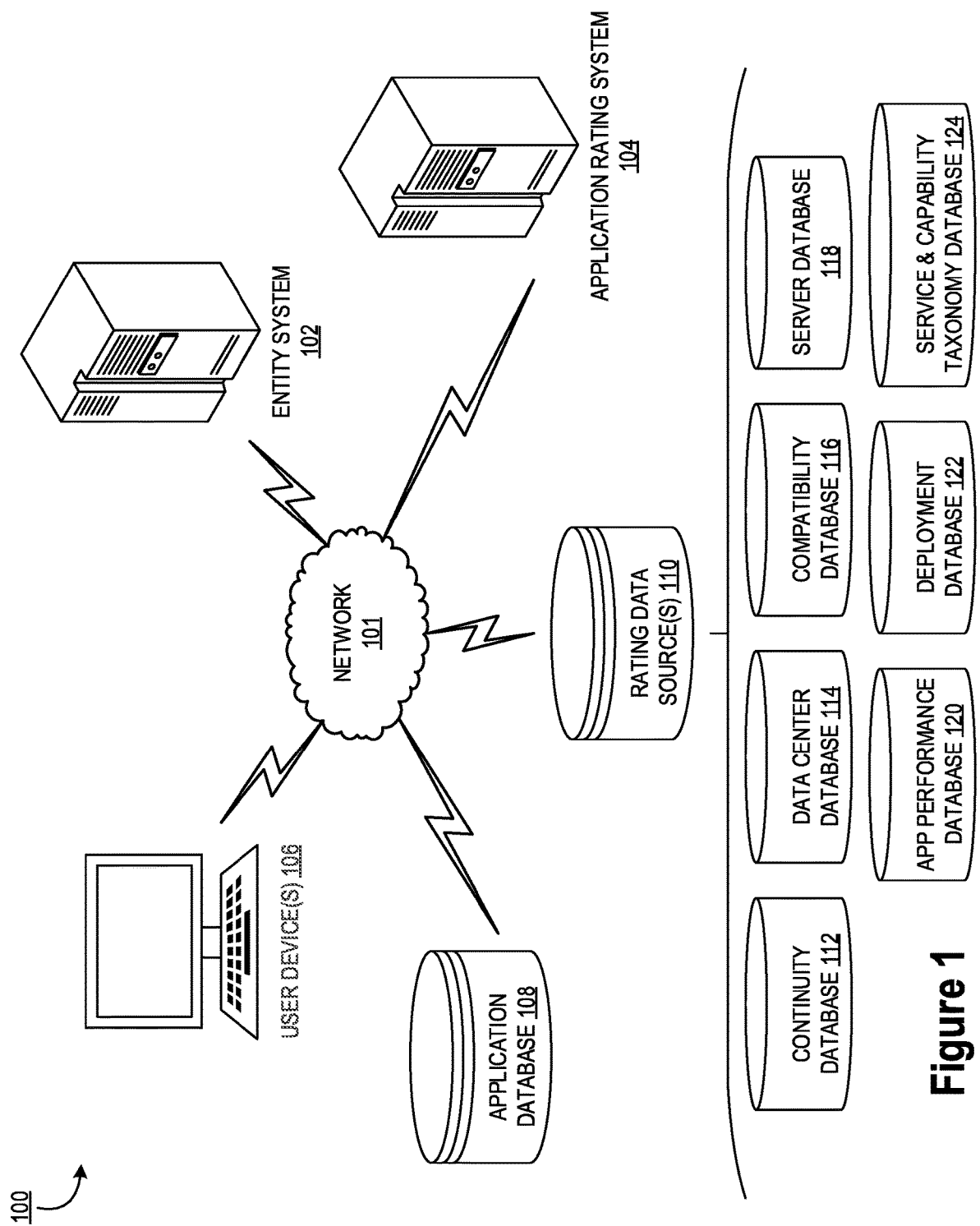
Figure 2:
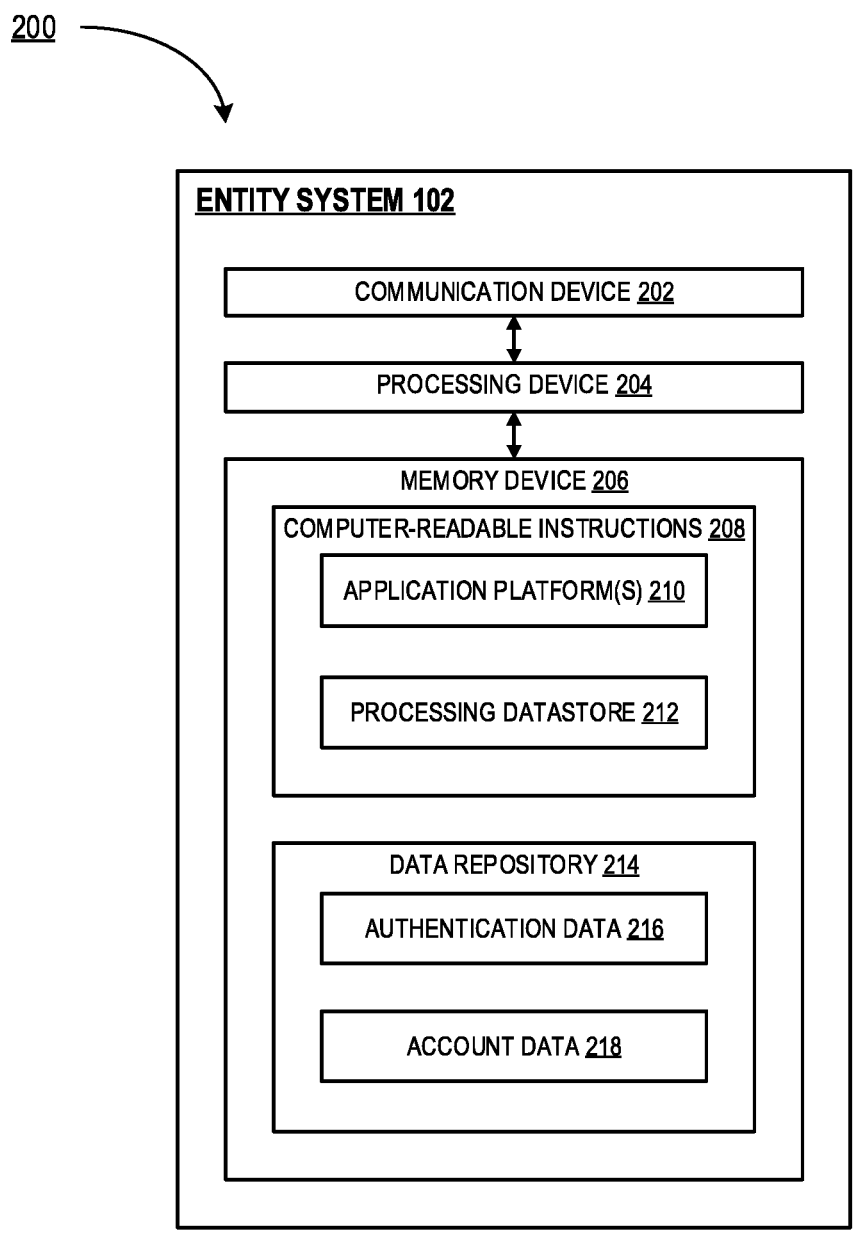
Figure 3:
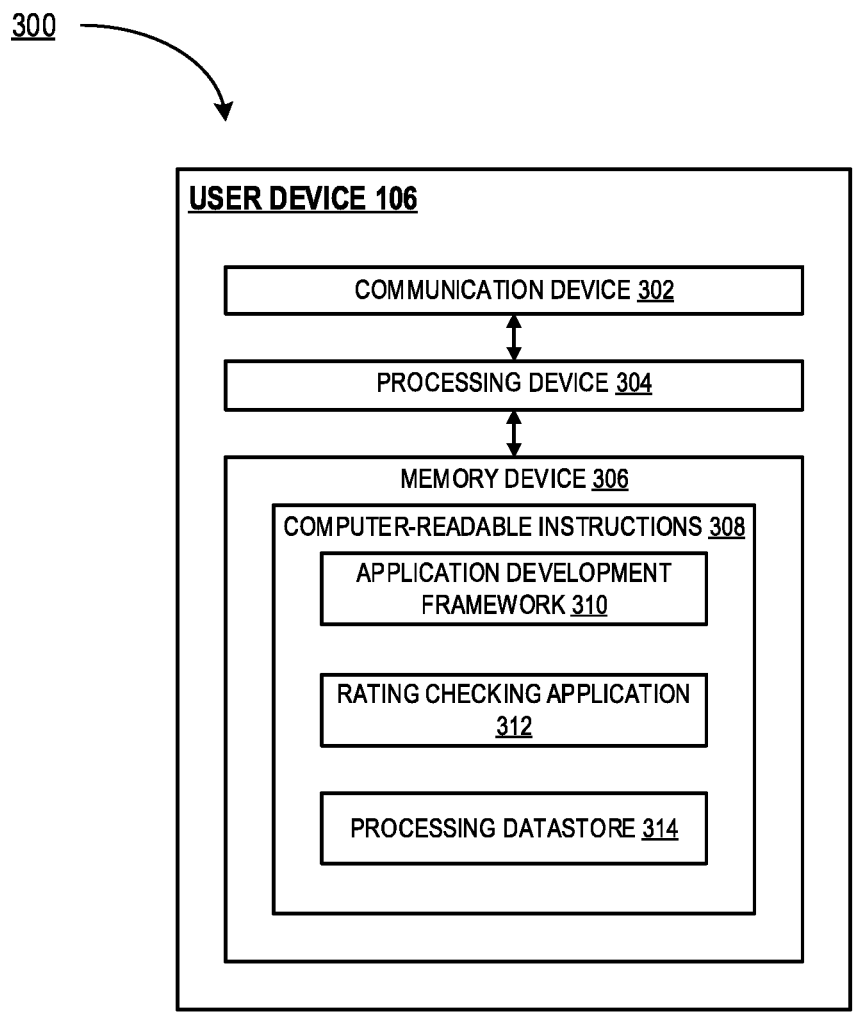
Figure 4:
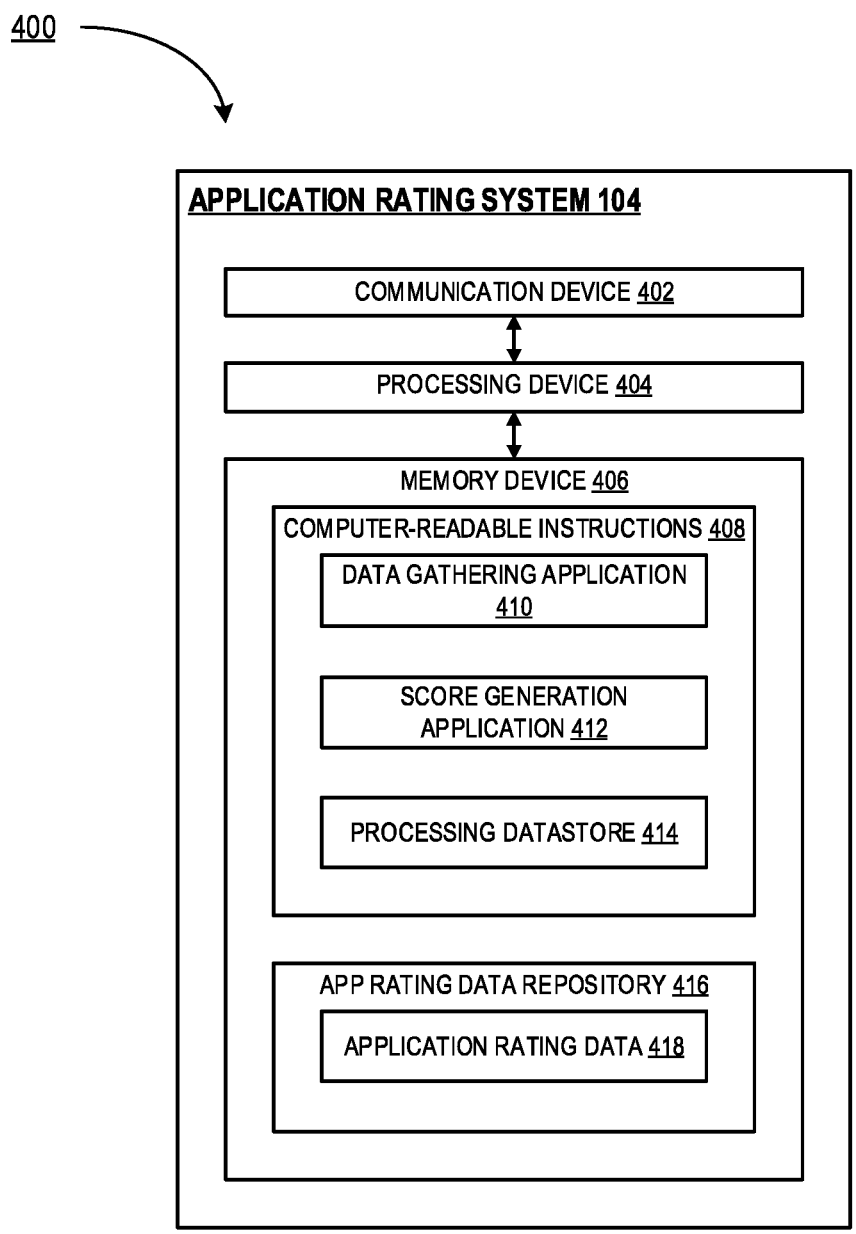
Figure 5:
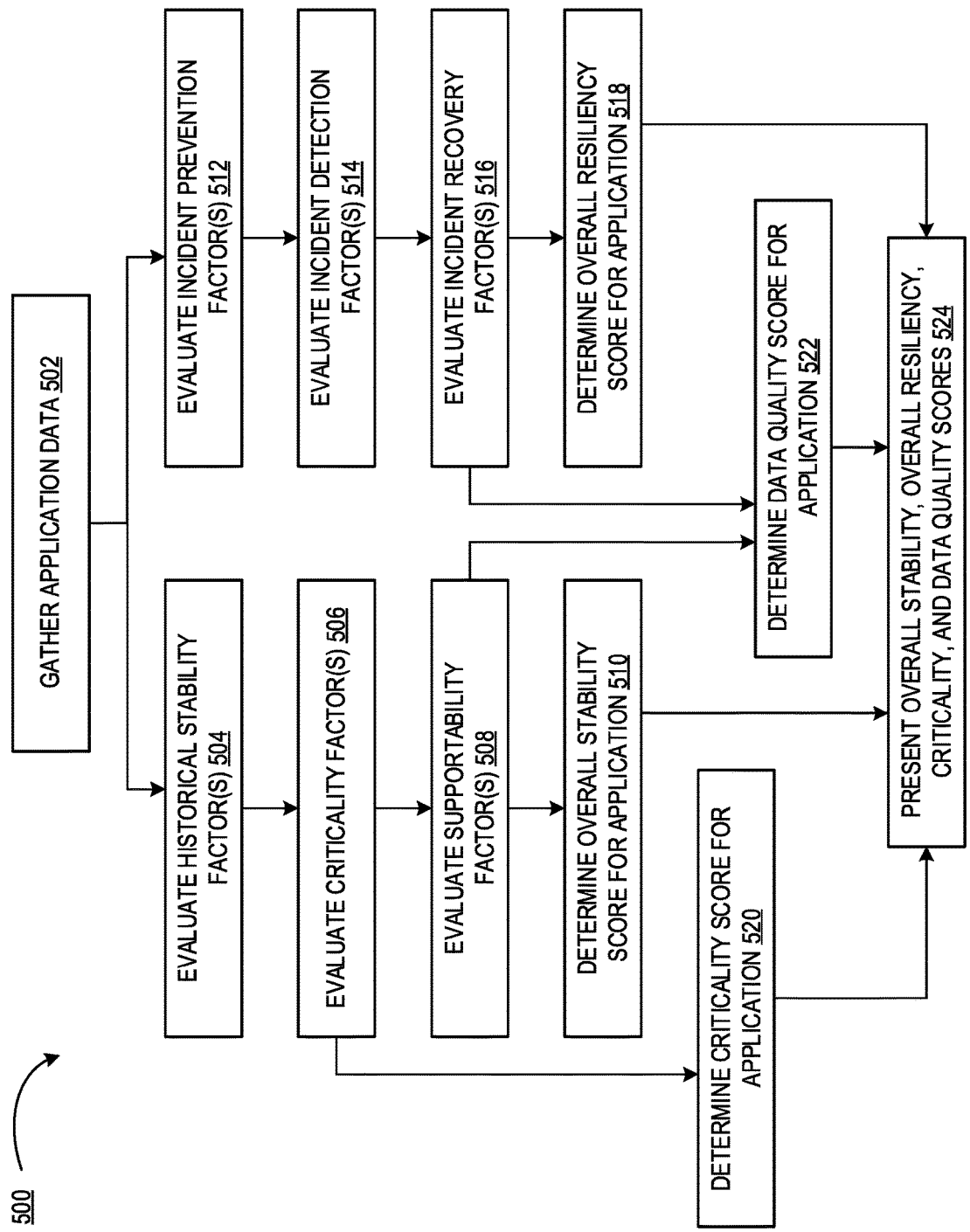
Figure 6:
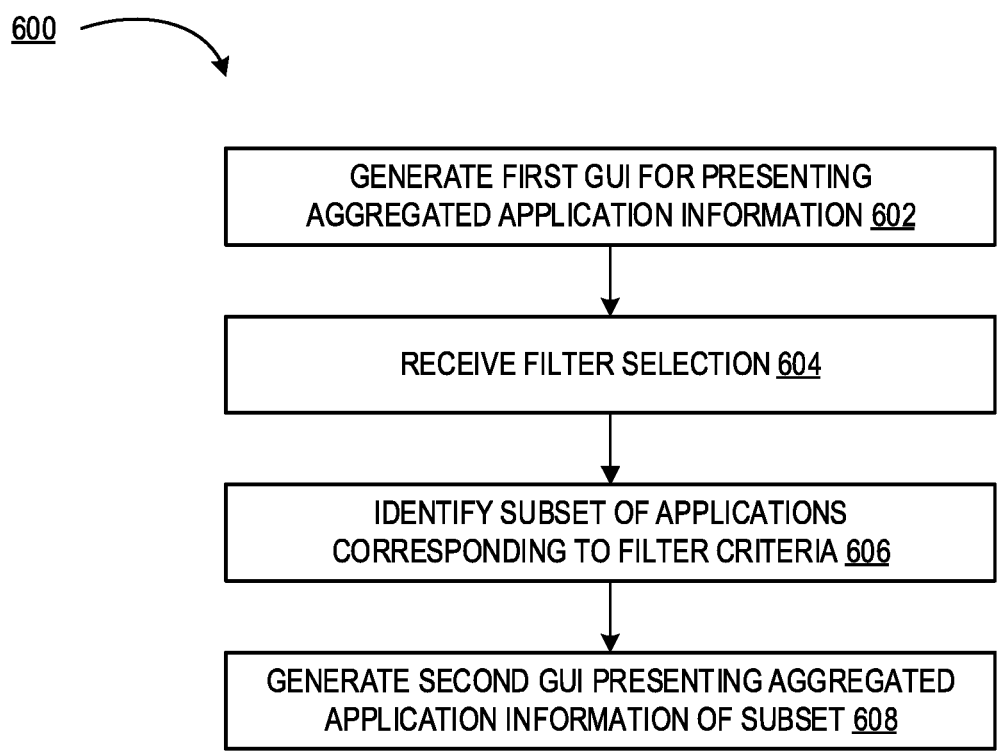
Figure 7:
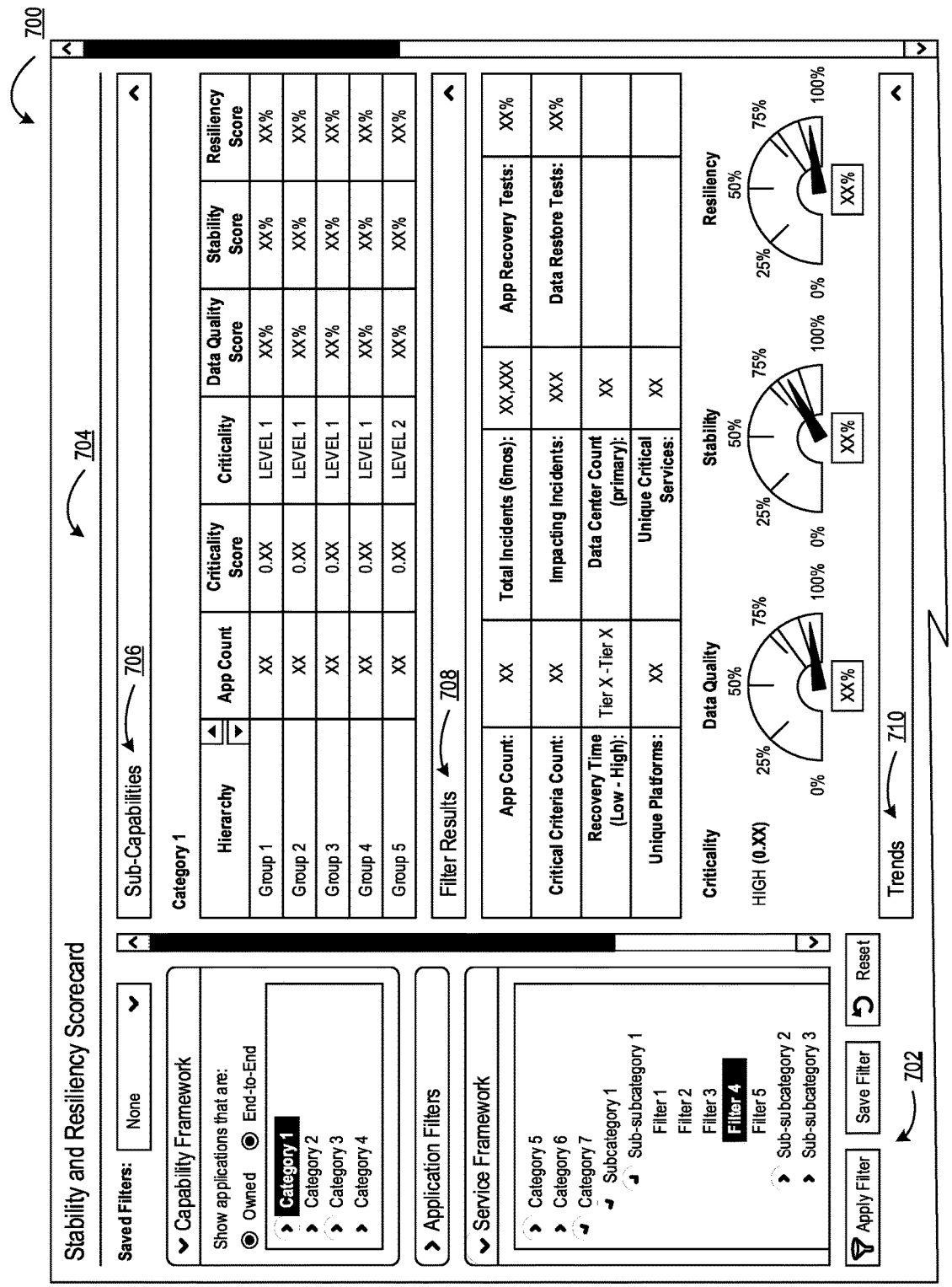
Figure 8:
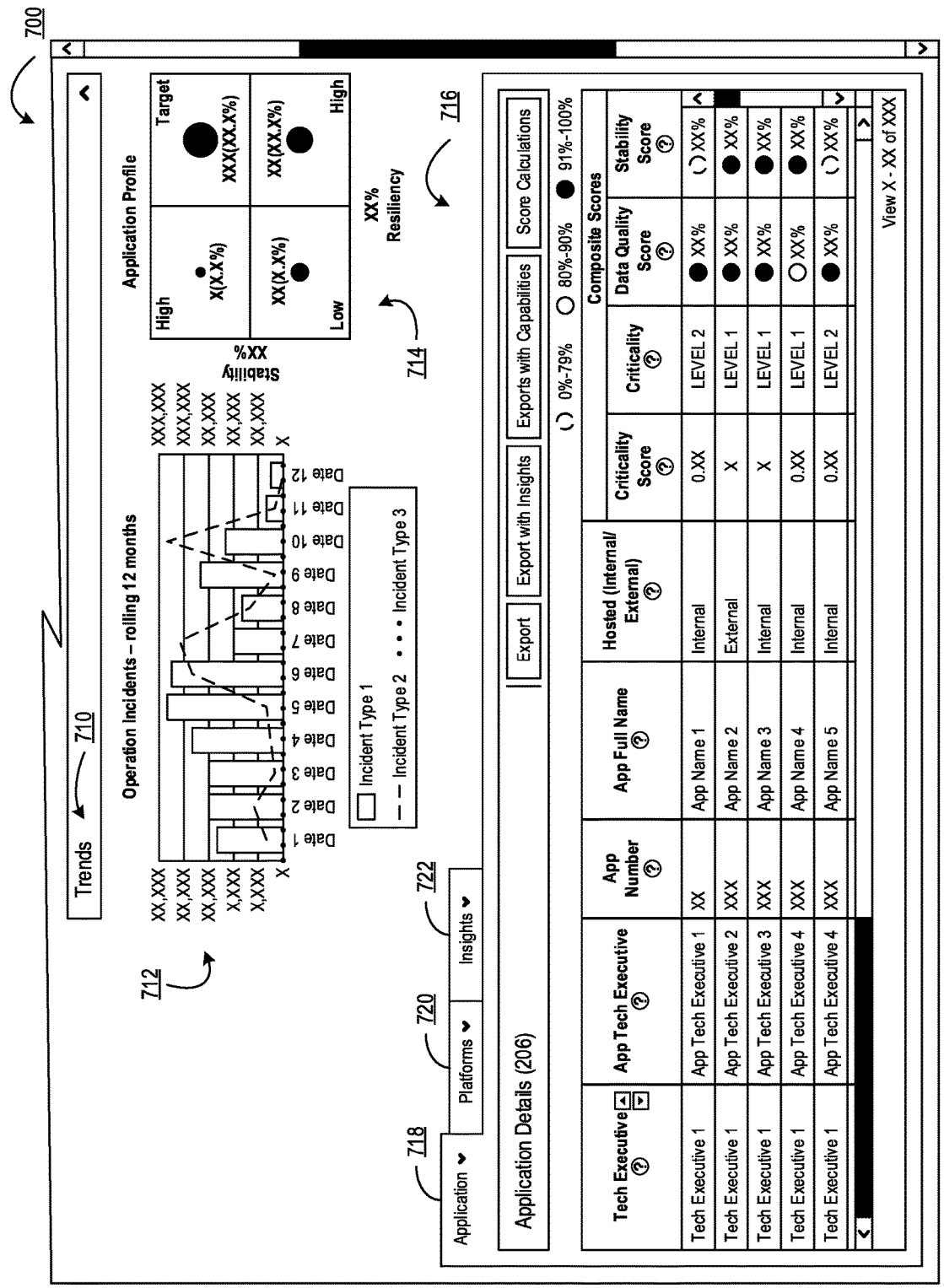
Figure 9:
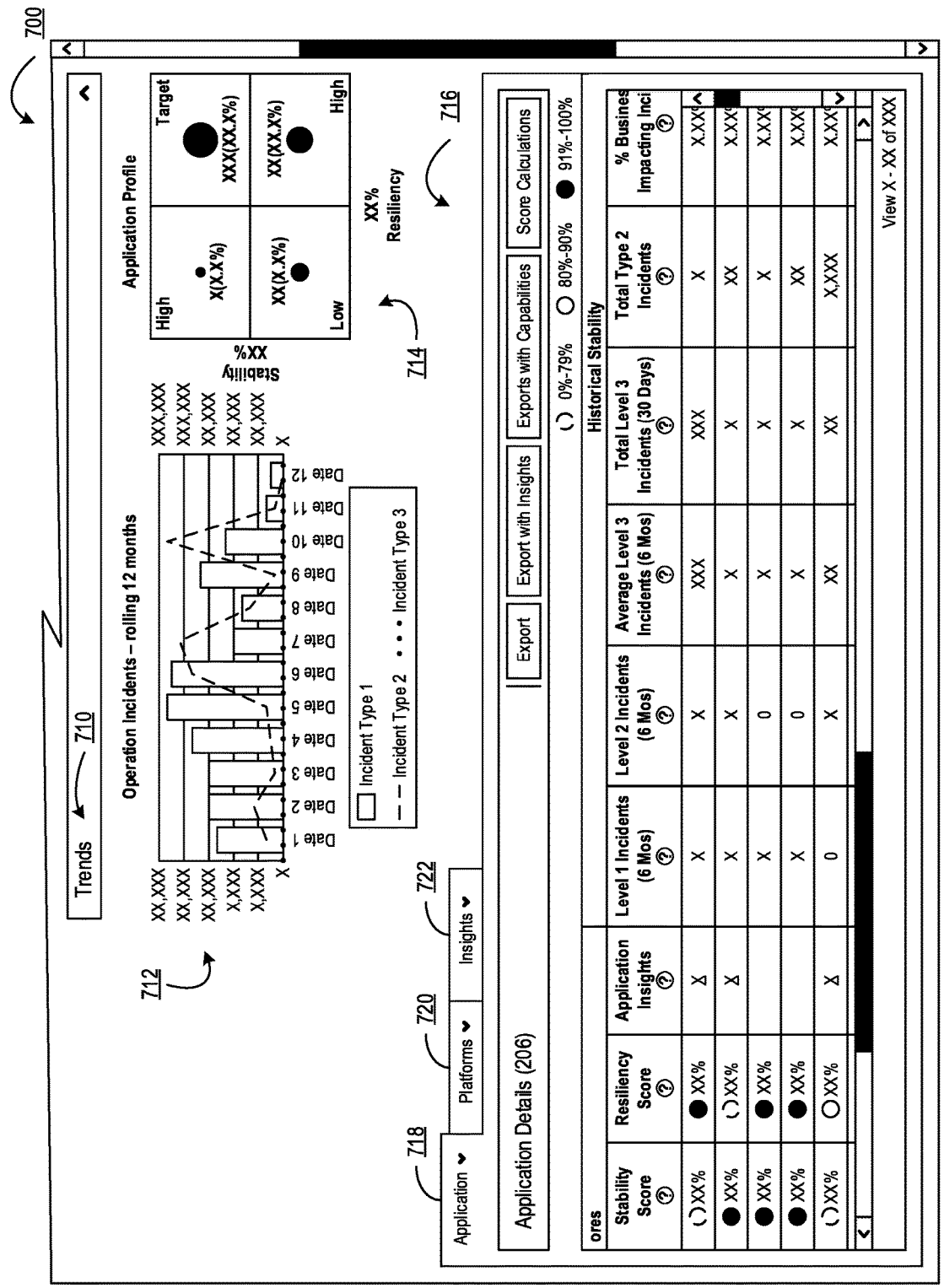
Figure 11:
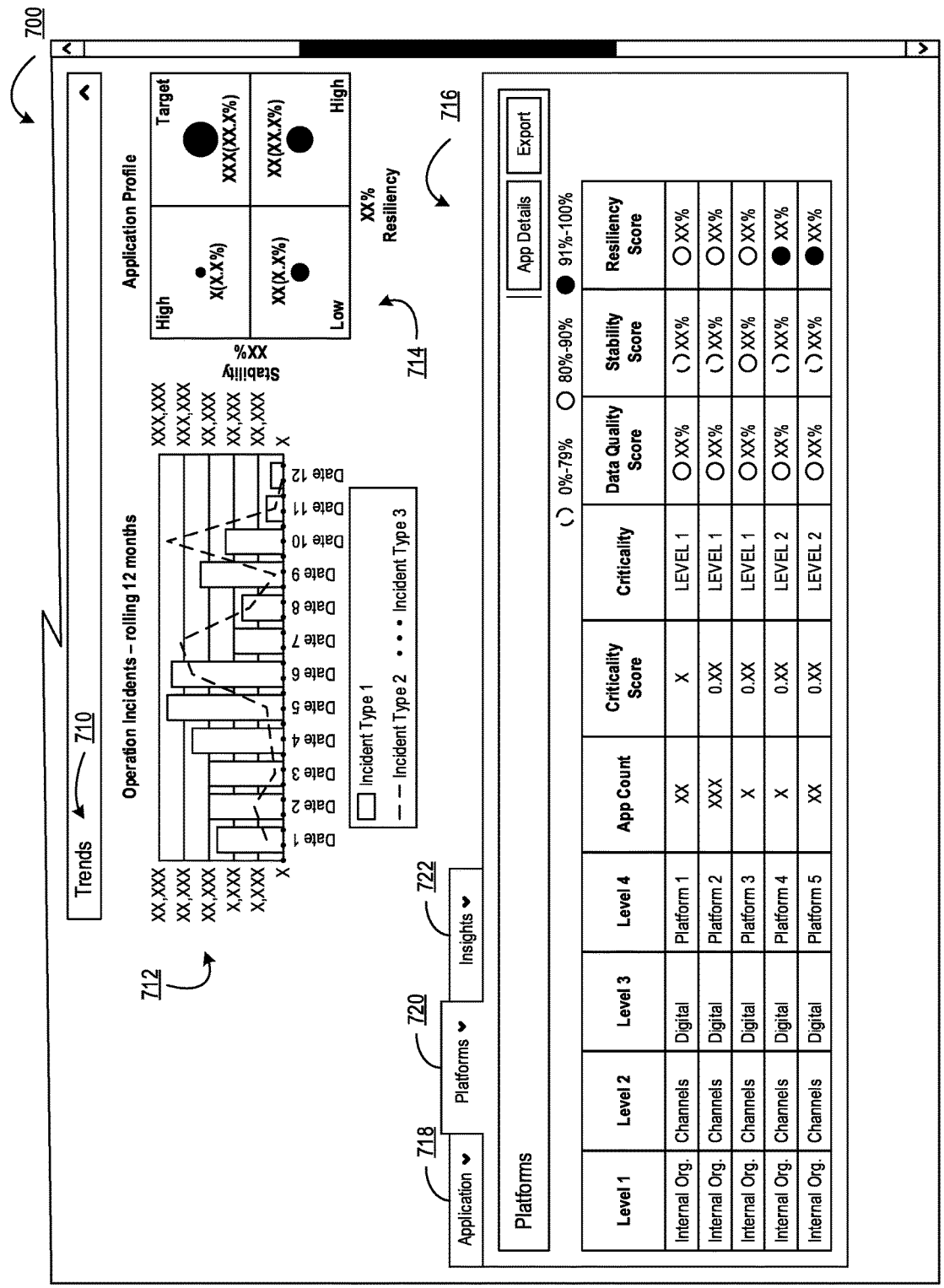
Figure 12:
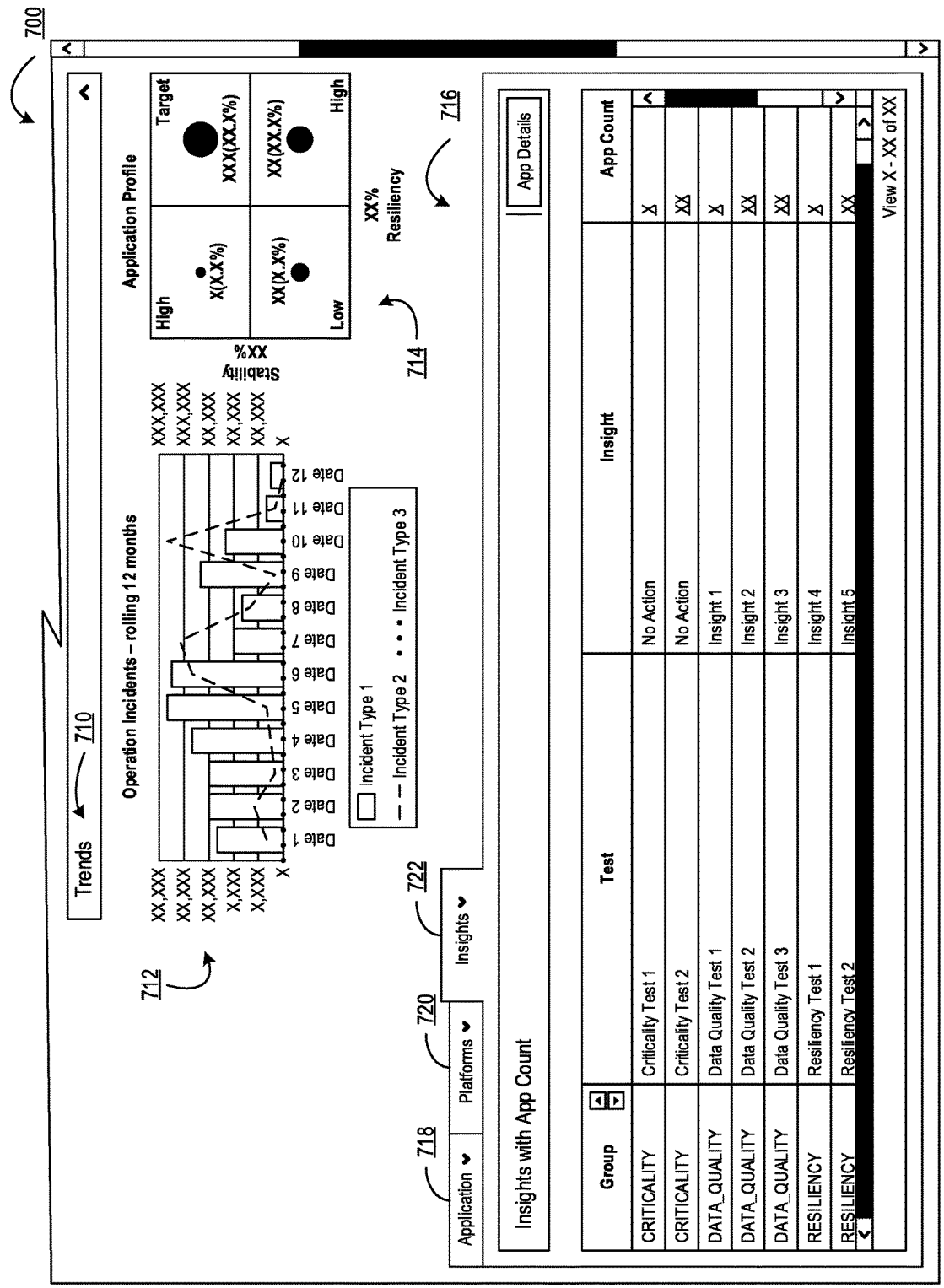

Having thus described embodiments of the invention in general terms, reference will now be made to the accompanying drawings, where:

FIG. 1 illustrates a block network architecture diagram illustrating a system environment 100 for determining platform stability and resiliency, in accordance with some embodiments of the invention;

FIG. 2 illustrates a block diagram 200 of an entity system, in accordance with some embodiments of the invention;

FIG. 3 illustrates a block diagram 300 of a user device, in accordance with some embodiments of the invention;

FIG. 4 illustrates a block diagram 400 of an application rating system, in accordance with some embodiments of the invention;

FIG. 5 illustrates a high-level process flow 500 for determining platform stability and resiliency, in accordance with some embodiments of the invention;

FIG. 6 illustrates a high-level process flow 600 for generating graphical user interfaces used to present platform stability and resiliency scores, in accordance with some embodiments of the invention;

FIG. 7 illustrates a representation of a graphical user interface 700 for display on a user device, in accordance with some embodiments of the invention;

FIG. 8 illustrates a representation of a continuation of the graphical user interface 700 of FIG. 7 for display on a user device, in accordance with some embodiments of the invention;

FIG. 9 illustrates a representation of another continuation of the graphical user interface 700 of FIG. 7 for display on a user device, in accordance with some embodiments of the invention;

FIG. 10 illustrates a representation of a graphical user interface 800 for display on a user device, in accordance with some embodiments of the invention;

FIG. 11 illustrates a representation of another continuation of the graphical user interface 700 for display on a user device, in accordance with some embodiments of the invention;

FIG. 12 illustrates a representation of another continuation of the graphical user interface 700 for display on a user device, in accordance with some embodiments of the invention.

DETAILED DESCRIPTION OF EMBODIMENTS OF THE INVENTION

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on."

In some embodiments, an "entity" or "enterprise" as used herein may be any institution employing information technology resources and, particularly, technology infrastructures configured for large-scale processing of electronic files, electronic technology event data and records, and performing/processing associated technology activities. In some instances, the entity's technology systems comprise multiple technology applications across multiple distributed technology platforms for large scale processing of technology activity files and electronic records. As such, the entity may be any institution, group, association, financial institution, merchant, establishment, company, union, authority, or the like, employing technology resources.

As described herein, a "user" is an individual associated with an entity. In some embodiments, a "user" may be an employee (e.g., a technology operator/technician, an associate, a project manager, an information technology (IT) specialist, a manager, an administrator, an internal operations analyst, or the like) of the entity or enterprise affiliated with the entity who is capable of operating the systems described herein. In some embodiments, a "user" may be any individual or system who has a relationship with the entity, such as a merchant. In some embodiments, a user may be a system performing one or more tasks described herein.

A "customer" is also an individual, group, or system associated with the entity. In some embodiments, a customer may be an individual, group, or system having past relationships, current relationships, or potential future relationships with an entity. For example, in the instances where the entity is a resource entity or a merchant, financial institution, or the like, a customer may be an individual, group, or system with one or more relationships, affiliations, or accounts with the entity (e.g., the merchant, financial institution, or the like). In some instances, a customer may not be a direct customer of the entity but may instead by any individual, group, or system who has a relationship with a direct customer of the entity.

A "technology resource" or "account" may be the relationship that the customer has with the entity. Examples of technology resources include a deposit account, such as a transactional account (e.g. a banking account), a savings account, an investment account, a money market account, a time deposit, a demand deposit, a pre-paid account, a credit account, customer information, or the like. The technology resource or account may be associated with and/or maintained by an entity, and may typically be associated with technology infrastructure such that the resource or account may be accessed, modified, or acted upon by the customer electronically, for example, using transaction terminals, user devices, merchant systems, and the like. In some embodiments, the entity may provide one or more technology instruments or financial instruments to the customer for executing resource transfer activities or financial transactions. In some embodiments, the technology instruments/financial instruments, such as electronic tokens, credit cards, debit cards, checks, loyalty cards, user device applications, account identifiers, routing numbers, passcodes and the like, may be associated with one or more resources or accounts of the customer. As discussed, in some embodiments, the entity may represent a vendor or a merchant with whom the customer engages in financial transactions (e.g., resource transfers like purchases, payments, returns, enrolling in merchant accounts, and the like) or non-financial transactions (for resource transfers associated with loyalty programs and the like), either online or in physical stores or merchant locations.

As used herein, a "user interface" may be an interface for user-machine interaction. In some embodiments, the user interface comprises a graphical user interface (GUI). A GUI is a type of user interface that allows users to interact with electronic devices via graphical icons and visual indicators, such as graphical widgets, graphical icons, and visual indicators (e.g., secondary notation), as opposed to using only text via the command line. In some instances, a GUI may include both graphical elements and text elements. A GUI may also An electronic activity, also referred to as a "technology activity" or a "customer activity," such as a "resource transfer" or "transaction," may refer to any activities or communications between a customer or entity and a financial institution, between the customer and the entity, activities or communication between multiple entities, communication between technology applications, and the like. A resource transfer may refer to a payment, a processing of funds, a purchase of goods or services, a return of goods or services, a payment transaction, a credit transaction, or other interactions involving a customer's resource or account. In the context of a financial institution or a resource entity such as a merchant, a resource transfer may refer to one or more of: a transfer of resources/funds between financial accounts (also referred to as "resources"), a deposit of resources/funds into a financial account or resource (e.g., depositing a check), a withdrawal of resources or funds from a financial account, a sale of goods and/or services, initiating an automated teller machine (ATM) or online banking session, an account balance inquiry, a rewards transfer, opening a bank application on a customer's computer or mobile device, a user accessing their e-wallet, applying one or more coupons to purchases, or any other interaction involving the customer and/or the customer's personal device that invokes or that is detectable by or associated with the financial institution. A resource transfer may also include one or more of the following: renting, selling, and/or leasing goods and/or services (e.g., groceries, stamps, tickets, DVDs, vending machine items, and the like); making payments (e.g., paying monthly bills and the like); loading money onto stored value cards (SVCs) and/or prepaid cards; donating to charities; and/or the like. Unless specifically limited by the context, a "resource transfer," a "transaction," a "transaction event," or a "point of transaction event" may refer to any customer activity (financial or non-financial activity) initiated between a customer and a resource entity (such as a merchant), between the customer and a financial institution, or any combination thereof.

In accordance with embodiments of the invention, the term "electronic communication" may refer to a communication associated with a user, typically received, viewed, and/or transmitted via a communication channel. In some embodiments, electronic communications may be associated with user communications relating to user travel, user appointments, etc. (e.g., non-financial communications). In some embodiments, electronic communications may be associated with user communications relating to user financial statements (e.g., savings statements, shareholder notices, etc.), bill payments, account notifications, communications requiring actions to be performed by the user, communications triggering resource/account activities, documents to be signed by the user, etc. (e.g., financial communications). In some embodiments, communication channels may comprise cellular, audio, email, cellular messaging, website, mobile application notifications, and the like.

Under current systems and methods, an entity may operate a system that has one or more software platforms that are configured to perform one or more functions. Applications may be created and deployed onto the platform(s) to increase the functions that can be performed by the platform(s). However, when the number of applications becomes large, it can be difficult to identify the quality of the applications on the platform, such as whether a given application is functioning as intended or has underlying reliability and/or stability issues. For example, when dealing with a large number of applications, an individual may have difficulty identifying applications that include third-party products that are no longer supported from the vendors that released them and thus may have supportability issues in the future. Additionally, information about the operation of the applications may be stored in a large number of data centers, making it difficult for individuals to determine an overall picture of the quality of a given application or a group of applications. Further, even if an individual is able to determine the quality of a single application, it may be difficult for individuals to see patterns and relationships between applications, particularly when those patterns and relationships may not be immediately obvious. This may be, for example, due at least in part to the quantity of data needed for an analysis of a large number of applications. Moreover, it may be difficult for an individual to assess the quality, such as the stability and resiliency, of an application relative to another application when the second application is configured to perform different functions from the first application.

Accordingly, embodiments of the present disclosure are directed to an analysis system for determining platform stability and resiliency based on the underlying stability and resiliency of the applications operating on the platform. Embodiments of the present disclosure are also configured to generate GUIs that can present information on the stability and resiliency of applications in an easy-to-understand manner. More specifically, an application rating system may gather information about applications deployed or scheduled to be deployed onto one or more platforms and use the gathered information to evaluate various factors relative to the stability and resiliency of each application, where each factor measures a level of stability or resiliency of the application. From these factors, the application rating system may generate overall stability, overall resiliency, criticality, and data quality scores for each application. The application rating system may further generate GUIs that present aggregated scores from the overall stability, overall resiliency, criticality, and data quality scores for some or all of the applications, as well as present additional information about the applications, such as the factors used to determine the scores. These GUIs may include selectable elements such that a user can filter the applications by functionality, platform the applications are deployed on, and the like. As such, the GUIs may allow a user to view trends in selected subsets of the applications. Moreover, the GUIs may include one or more recommended actions that the developer of an application can take to increase the scores for the application and thus increase, for example, the stability and resiliency of the application.

As such, the system described herein identifies application weak links creating underlying platform instability, which would be difficult for an individual to identify without the system described herein due to the quantity of applications and operation data that the individual would have to parse through. Because the applications can be filtered in the GUIs, an individual may also be able to more narrowly view stability and resiliency information for particular platforms or functionalities and thus view underlying issues in those platforms or functionalities. Further, the system helps an individual easily understand where issues in a given application are and how they can be potentially fixed. For example, the GUIs generated by the system may help an individual understand where architecture and design changes versus process and control changes will help improve overall reliability. In addition, the system may generate a list of recommended actions for an application or a group of applications to improve the stability and/or resiliency scores, thereby further addressing changes that can be made to improve the functioning of an application or group of applications. Because the system described herein generates scores for a large number of applications, the system may also help focus the priority of remediation and upgrade activities on the lowest-scoring applications and/or applications with high criticality scores in order to optimize stability and/or resiliency performance of the one or more platform(s) as a whole.

Referring to FIG. 1, a block diagram illustrating a system environment 100 configured for determining platform stability and resiliency is illustrated, in accordance with some embodiments of the invention. As illustrated, the system environment 100 includes an entity system 102 in operative communication with an application rating system 104 and a user device 106. As such, the entity system 102, the application rating system 104, and the user device 106 are configured to send data to and receive data from each other, such as data relating to scoring applications being operated by or scheduled to be operated by the entity system 102. The system environment 100 also includes an application database 108 and one or more data source(s) 110 for the application rating system 104.

Typically, the entity system 102, the application rating system 104, the user device 106, the application database 108, and the data source(s) 110 are in electronic communication with each other via the network 101, which may be the internet, an intranet, or the like. The network 101 is configured to establish an operative connection between otherwise incompatible devices, for example, by establishing a communication channel, automatically and in real time, between the entity system 102, the application rating system 104, and/or the user device 106. In this regard, the wireless communication channel may further comprise near field communication (NFC), communication via radio waves, communication through the internet, communication via electromagnetic waves, and the like. For example, in FIG. 1, the network 101 may include a local area network (LAN), a wide area network (WAN), a global area network (GAN), and/or a near field communication (NFC) network. Accordingly, the network 101 may provide for wireline, wireless, or a combination of wireline and wireless communication between devices in the network 101.

The entity system 102 is associated with the entity and configured to operate one or more platforms by which one or more applications stored in the application database 108 can be operated. The entity system 102 may also store information relating to the operation of those applications in the data source(s) 110. The entity system 102 may store information relating to the relationship a customer has with the entity, for example, internally. The components of the entity system 102, its features, and its functions will be described in further detail below and with respect to FIG. 2, in particular.

The application rating system 104 is configured to evaluate the one or more applications stored in the application database 108 based on the information about the one or more applications stored in the application database 108 and the information relating to the operation of the one or more applications stored in the data source(s) 110. The application rating system 104 is further configured to generate scores for each of the one or more applications, with the scores for a given representing aspects (e.g., stability and resiliency aspects) of the application. Additionally, the application rating system 104 is configured to generate GUIs used to present the scores. The components of the application rating system 104, its features, and its functions will be described in further detail below and with respect to FIG. 4, in particular.

A user device 106 may comprise a computing system, such as a desktop computer or laptop computer, though the user device 106 may also comprise a mobile communications device. For example, the user device 106 may comprise a cellular telecommunications device (e.g., a smartphone or mobile phone), a personal digital assistant (PDA), a mobile internet accessing device, or the like. The user device 106 is configured to connect to the network 101, as well as receive and transmit information over the network 101. As an illustration, the user device 106 may receive information from the applicating rating system 104, such as GUIs presenting the scores determined for one or more applications stored in the application database 108, as described below. The components of the user device 106, its features, and its functions will be described in further detail below and with respect to FIG. 3, in particular.

The application database 108 is configured to store one or more applications that operate on the platform(s) of the entity system 102. In some embodiments, as noted above, the entity system 102 may operate one or more software platforms configured to perform certain functions. Users may then write code to create applications configured to perform one or more additional functions. The applications can be deployed onto the software platform(s), thereby adding to the functions the software platform(s) can perform. These applications are accordingly stored in the application database 108. The application database 108 may also store metadata about the one or more applications, such as application data. In some instances, the application database 108 may be a single data storage unit, as shown in FIG. 1, while in other instances, the application database 108 may be comprised of two or more networked data storage units.

The data source(s) 110 are configured to store information relating to the operation of the one or more applications stored in the application database 108. Accordingly, the data source(s) 110 may include a number of databases, with each database storing different information about the application operations. FIG. 1 illustrates a number of exemplary databases that may make up the data source(s) 110. As such, in some embodiments, the data source(s) 110 may include a continuity database 112, a data center database 114, a compatibility database 116, a server database 118, an application performance database 120, a deployment database 122, and a service and capability taxonomy database 124.

The continuity database 112 may be configured to store information on providing continuous operation of the application. For example, the continuity database 112 may store information on the recovery, testing, backup strategies, corruption strategies, operation incidents (e.g., incidents of operation outage of the application), impacts, problems, and changes for the application. To illustrate, the continuity database 112 may include a recovery point objective (RPO), an objective for the most seconds of data lost when an operation incident occurs, and a recovery time objective (RTO), an objective for the most amount of time needed to bring an application back into operation after an operation incident.

The data center database 114 may store information on the instances and locations for data centers used by the one or more applications stored in the application database 108. The compatibility database 116 may store information on present and future application compatibility. For example, for a given application, the compatibility database 116 may store information on whether the application uses any technology products that have been designated as not permitted (e.g., due to the product having a possibility of a security issue or the product being out of support from the vendor), information on whether the application has experienced configuration drift, and information and trust scores for vendors that have products used in the application. The server database 118 may store information on servers used by the one or more applications stored in the application database 108. As an example, the server database 118 may store server data, as well as server capacity and storage alerts.

The application performance database 120 may store information on the performance of the one or more applications stored in the application database 108, as well as information that affects the performance of the one or more applications. For example, the application performance database 120 may store open audit items, domain names, and platforms for the one or more applications, as well as functions performed by the entity system 102 that are affected by the application(s). The deployment database 122 may store information about the deployment of and updates for the one or more applications stored in the application database 108. As an illustration, the deployment database 122 may store capacity metrics for a next generation of applications, application release schedules, defects in application releases, onboarding metrics, and onboarding histories.

The service and capability taxonomy database 124 may store information on how the one or more applications relate to the business services performed by the one or more platforms of the entity system 102. For example, the service and capability taxonomy database 124 may store business services and application counts involved in performing those business services, as well as mappings of the business taxonomy of the entity system 102 and how the one or more application(s) fit into the mapping.

It should be understood that databases 112-124 are intended to be exemplary and that, in other embodiments, additional, fewer, or different databases may be included as part of the system environment 100. It should be further understood that, in some instances, each of the databases 112-124 may be a single data storage unit, as shown in FIG. 1, while in other instances, one or more of the databases 112-124 may be comprised of two or more networked data storage units (e.g., in some cases, with each of the networked data storage units storing different subcategories of data) and/or one or more of the databases 112-124 may be combined into a single database.

FIG. 2 illustrates a block diagram 200 of the entity system 102, in accordance with some embodiments of the invention. As illustrated in FIG. 2, the entity system 102 may include a communication device 202, a processing device 204, and a memory device 206 having application platform(s) 210 and a processing datastore 212 stored therein. As shown, the processing device 204 is operatively connected to and configured to control and cause the communication device 202 and the memory device 206 to perform one or more functions. In some embodiments, the application platform 210 comprises computer-readable instructions or computer-readable code that when executed by the processing device 204 cause the processing device 204 to perform one or more functions. For example, the application platform 210 may include a computer-readable program code having one or more executable portions. It will be understood that the application platform 210 may be executable to initiate, perform, complete, and/or facilitate one or more portions of any embodiments described and/or contemplated herein.

The communication device 202 may generally include a modem, server, transceiver, and/or other device for communicating with other devices on the network 101. In some embodiments, the communication device 202 may be a communication interface having one or more communication devices configured to communicate with one or more devices on the network 101, such as the application rating system 104, the user device 106, the application database 108, and the data source(s) 110. The communicative connection to one or more devices on the network 101 may be via a wired or wireless connection. In this regard, the wireless communication channel may comprise near field communication (NFC), communication via radio waves, communication through the internet, communication via electromagnetic waves, communication via applicable cellular systems of wireless telephone networks, and the like.

Additionally, referring to the entity system 102 illustrated in FIG. 2, the processing device 204 may generally refer to a device or combination of devices having circuitry used for implementing the communication and/or logic functions of the processing device 204. For example, the processing device 204 may include a control unit; a digital signal processor device; a microprocessor device; and various analog-to-digital converters, digital-to-analog converters, and other support circuits and/or combinations of the foregoing. Control and signal processing of the entity system 102 may be allocated between these processing devices according to their respective capabilities. The processing device 204 may further include functionality to operate one or more software programs based on computer-readable instructions 208 thereof, which may be stored in the memory device 206, such as the application platform 210.

As the phrase is used herein, a processing device may be "configured to" perform a certain function in a variety of ways, including, for example, by having one or more general-purpose circuits perform the function by executing particular computer-executable program code embodied in a computer-readable medium and/or by having one or more application-specific circuits perform the function. The processing device 204 may be configured to use the network communication interface of the communication device 202 to transmit and/or receive data and/or commands to and/or from the other devices/systems connected to the network 101.

The memory device 206 within the entity system 102 may generally refer to a device or combination of devices with one or more forms of computer-readable media for storing data and/or computer-executable program code/instructions. For example, the memory device 206 may include any computer memory that provides an actual or virtual space to temporarily or permanently store data and/or commands provided to the processing device 204 when it carries out the functions described herein.

The entity system 102 may further include a data repository 214 comprising authentication data 216 and account data 218. The processing device 204 may utilize the authentication data 216 to validate authentication credentials of customers attempting, for example, to check a balance of an account or technology resource held with the entity. The account data 220 may reflect current account data for various customers of the entity or, in some embodiments, different data that a user or customer of the entity may request to access.

In some embodiments, the application platform(s) 210 may comprise computer-readable instructions associated with one or more platforms, where each platform performs one or more functions. Further, one or more applications may be deployed onto each platform that expand the functions that can be performed by the platform. Alternatively, in some embodiments, the application platform(s) 210 may be stored in the processing datastore 212. In some embodiments, the application platform(s) 210 comprises computer-readable instructions that, when executed by the processing device 204, cause the processing device 204 to perform one or more actions and/or transmit control instructions to other components or devices to generate the application platform(s). In some instances, the application platform(s) 210 may be implemented as a centralized module as shown in FIG. 2, while in other instances, the application platform(s) 210 may be implemented as a series of connected modules or applications that form the platform(s). It should be understood that the discussion of a platform of the entity system 102 herein may refer to a single platform or may refer to multiple platforms.

FIG. 3 illustrates a block diagram 300 of the user device 106, in accordance with some embodiments of the invention. As illustrated in FIG. 3, the user device 106 may include a communication device 302; a processing device 304; and a memory device 306 having an application development framework 310, a rating checking application 312, and a processing datastore 314 stored therein. As shown, the processing device 304 is operatively connected to and configured to control and cause the communication device 302 and the memory device 306 to perform one or more functions. In some embodiments, the application development framework 310 and/or rating checking application 312 comprises computer-readable instructions or computer-readable code that when executed by the processing device 304 cause the processing device 304 to perform one or more functions. For example, the application development framework 310 and/or rating checking application 312 may include computer-readable program code having one or more executable portions. It will be understood that the application development framework 310 and/or the rating checking application 312 may be executable to initiate, perform, complete, and/or facilitate one or more portions of any embodiments described and/or contemplated herein.

The communication device 302 may generally include a modem, server, transceiver, and/or other device for communicating with other devices on the network 101. In some embodiments, the communication device 302 may be a communication interface having one or more communication devices configured to communicate with one or more devices on the network 101, such as the entity system 102, the application rating system 104, the application database 108, and the data source(s) 110. As such, the communicative connection of the communication device 302 may be a wired or wireless connection similar to the implementation of the communication device 202 of the block diagram 200 of the entity system 102.

Referring to the user device 106 illustrated in FIG. 3, the processing device 304 may generally refer to a device or combination of devices having circuitry used for implementing the communication and/or logic functions of the processing device 304. In this way, the processing device 304 may be configured similarly to the processing device 204 of the block diagram 200 of the entity system 102. Additionally, the processing device 304 may further include functionality to operate one or more software programs based on computer-readable instructions 308 thereof, which may be stored in the memory device 306, such as the application development framework 310 and the rating checking application 312. The processing device 304 may also be configured to use the network communication interface of the communication device 302 to transmit and/or receive data and/or commands to and/or from the other devices/systems connected to the network 101, similar to the processing device 204 of the entity system 102.

The memory device 306 within the user device 106 may generally refer to a device or combination of devices with one or more forms of computer-readable media for storing data and/or computer-executable program instructions. For example, the memory device 306 may include any computer memory that provides an actual or virtual space to temporarily or permanently store data and/or commands provided to the processing device 304 when it carries out the functions described herein, similar to the memory device 206 of the block diagram 200 of the entity system 102.

In some embodiments, the application development framework 310 may comprise computer-readable instructions associated with generating one or more application development platforms, or the computer-readable instructions associated with generating an application development platform(s) may be stored in the processing datastore 314, in some embodiments. More specifically, generating an application development platform may include operating a software platform that facilitates a user, such as an application developer, in developing one or more applications that may be deployed onto a platform of the entity system 102 (e.g., the application platform(s) 210). The application development framework 310 may be a framework that can be used to create applications for a variety of platforms and/or functionalities, or the application development framework 310 may be a framework specific to creating applications for the application platform(s) 210 of the entity system 102 and/or that is directed to creating applications for a specific type of functionality. In some embodiments, the application development framework 310 comprises computer-readable instructions that, when executed by the processing device 304, cause the processing device 304 to perform one or more functions and/or transmit control instructions to other components or devices to generate the application development framework described herein.

In some embodiments, the rating checking application 312 may comprise computer-readable instructions associated with performing one or more steps for checking an application's rating, which is described in further detail below, or the computer-readable instructions associated with performing the one or more steps for checking an application's rating may be stored in the processing datastore 314, in some embodiments. In some embodiments, the rating checking application 312 comprises computer-readable instructions that, when executed by the processing device 304, cause the processing device 304 to perform one or more functions and/or transmit control instructions to other components or devices to perform the one or more steps for checking an application's rating. In some cases, the rating checking application 312 may be implemented as an adaptation of an existing application, such by a web browser configured to access an intranet site through which the ratings for one or more applications can be displayed. In other cases, the rating checking application 312 may be implemented as a specialized application, such as an application specially designed for facilitating a user in checking application ratings.

FIG. 4 illustrates a block diagram 400 of the application rating system 104, in accordance with some embodiments of the invention. As illustrated in FIG. 4, the application rating system 104 may include a communication device 402; a processing device 404; and a memory device 406 having a data gathering application 410, a score generation application 412, and a processing datastore 414 stored therein. As shown, the processing device 404 is operatively connected to and configured to control and cause the communication device 402 and the memory device 406 to perform one or more functions. In some embodiments, the data gathering application 410 and/or score generation application 412 comprises computer-readable instructions or computer-readable code that when executed by the processing device 404 cause the processing device 404 to perform one or more functions. For example, the data gathering application 410 and/or score generation application 412 may include a computer-readable program code having one or more executable portions. It will be understood that the data gathering application 410 and/or score generation application 412 may be executable to initiate, perform, complete, and/or facilitate one or more portions of any embodiments described and/or contemplated herein.

The communication device 402 may generally include a modem, server, transceiver, and/or other device for communicating with other devices on the network 101. In some embodiments, the communication device 402 may be a communication interface having one or more communication devices configured to communicate with one or more devices on the network 101, such as the entity system 102, the user device 106, the application database 108, and the data source(s) 110. As such, the communicative connection of the communication device 402 may be a wired or wireless connection similar to the implementation of the communication device 202 of the block diagram 200 of the entity system 102.

Referring to the application rating system 104 illustrated in FIG. 4, the processing device 404 may generally refer to a device or combination of devices having circuitry used for implementing the communication and/or logic functions of the processing device 404. In this way, the processing device 404 may be configured similarly to the processing device 204 of the block diagram 200 of the entity system 102. Additionally, the processing device 404 may further include functionality to operate one or more software programs based on computer-readable instructions 408 thereof, which may be stored in the memory device 406, such as the data gathering application 410 and the score generation application 412. The processing device 404 may also be configured to use the network communication interface of the communication device 402 to transmit and/or receive data and/or commands to and/or from the other devices/systems connected to the network 101, similar to the processing device 204 of the entity system 102.

The memory device 406 within the application rating system 104 may generally refer to a device or combination of devices that store one or more forms of computer-readable media for storing data and/or computer-executable program instructions. For example, the memory device 406 may include any computer memory that provides an actual or virtual space to temporarily or permanently store data and/or commands provided to the processing device 404 when it carries out the functions described herein, similar to the memory device 206 of the block diagram 200 of the entity system 102.

The application rating system 104 may further include an application rating data repository 416 comprising application rating data 418. The processing device 404 may utilize the application rating data 418 to evaluate the one or more applications stored in the application database 108, as described in further detail below.

In some embodiments, the data gathering application 410 may comprise computer-readable instructions associated with one or more data gathering steps, or the computer-readable instructions associated with one or more data gathering steps may be stored in the processing datastore 414, in some embodiments. The data gathering application 410 may be embodied within the score generation application 412, in some instances, or the score generation application 412 may be embodied in the data gathering application 410, in some instances. In some embodiments, the data gathering application 410 comprises computer-readable instructions that, when executed by the processing device 404, cause the processing device 404 to perform one or more functions and/or transmit control instructions to other components or devices to perform the one or more data gathering described herein.

These data gathering steps may include gathering information on the one or more applications from the application database 108 and gathering information on the operation of the one or more applications from the data source(s) 110. For example, the data gathering application 410 may be configured to identify all of the applications that are currently deployed on the platform(s) of the entity system 102 as well as, in some cases, the applications that will be employed on the platform(s) of the entity system 102 in the future from the information stored in the application database 108. The data gathering application 410 may further gather metadata on the one or more applications stored in the application database 108, such as the names of the application(s), numbers associated with the application(s), and the like. In addition, the data gathering application 410 may be configured to receive periodic information from the data source(s) 110 on the operation of the one or more applications, such as information on a daily, weekly, monthly, or ad hoc basis from the data source(s) 110. Moreover, the data gathering application 410 may be configured to gather and receive information on the platform(s) of the entity system 102, the business services performed by the entity system 102, the mapping of business services to the platform(s), and the like from the data source(s) for use in creating filters for the one or more applications, as discussed in further detail below. The data gathering application 410 is also configured to store the information gathered from the application database 108 and the data source(s) 110 on the one or more applications and their operation in the application rating data 418 of the application rating data repository 416.

In some embodiments, the score generation application 412 may comprise computer-readable instructions associated with one or more steps for generating application scores, or the computer-readable instructions associated with the one or more steps for generating application scores may be stored in the processing datastore 414, in some embodiments. The score generation application 412 may be embodied within the data gathering application 410, in some instances, or the data gathering application 410 may be embodied within the score generation application 412, in some instances. In some embodiments, the score generation application 412 comprises computer-readable instructions that, when executed by the processing device 404, cause the processing device 404 to perform one or more functions and/or transmit control instructions to other components or devices to perform the one or more steps for generating application scores described herein.

The steps for generating application scores may include evaluating the gathered information on the application(s) and the information about the operation of the application(s) that is stored in the application rating data 418 of the application rating data repository 416. More specifically, the score generation application 412 may evaluate factors relating to various aspects of a given application, such as how stable the application is in its operation, how resilient the application is to issues, and how critical the application is to the platform of the entity system 102. The score generation application 412 may use the evaluated factors to generate a series of scores for the application. For example, the score generation application 412 may determine, from the evaluated factors, which of a number of weighted criteria a given application meets and generate the scores for the application based on the met criteria. The score generation application 412 may also interface with the user device 106 to present the both individual and aggregated scores for a number of applications. For example, the score generation application 412 may be configured to generate GUIs that include individual and aggregated scores for a number of applications, as well as other information about the applications, such as the factors used to calculate the scores for an individual and/or aggregated set of applications. The GUIs may also include selectable filters that can be used to limit the applications shown in aggregate by platform, by functionality, and so on. The score generation application 412 may then transmit the GUIs to the user device 106.

It should be understood that while in FIGS. 1, 2, and 4, the entity system 102 and the application rating system 104 are shown as separate systems, in some embodiments, the entity system 102 and the application rating system 104 may be implemented partially or entirely as the same system. For example, the entity system 102 may be implemented as a series of networked servers that also host computer-readable code configured to be executed to perform the functions of the application rating system 104 as described above and in further detail below.

These features will now be described with respect to the process flow 500 of FIG. 5 and the process flow 600 of FIG. 6. Starting first with the process flow 500 of FIG. 5, in some instances, the application rating system 104 first gathers application data, as indicated by block 502. For instance, the application rating system 104 may gather a list of the one or more applications deployed or scheduled to be deployed onto the platform of the entity system 102, as well as metadata on the application(s), from the application database 108. The application rating system 104 also gathers information from the data source(s) 110 on the operation of the one or more applications. For instance, the application rating system 104 may be configured to gather the application operation data and/or the data source(s) 110 may be configured to transmit the application operation data according to a daily, weekly, monthly, or ad hoc schedule. As an illustration, the data on the operation of a given application may include information on continuous operation of the application(s) (e.g., from the continuity database 112), the identities and locations data center used by the application(s) (e.g., from the data center database 114), present and future application compatibility of the application(s) (e.g., from the compatibility database 116), servers used by the application(s) (e.g., from the server database 118), application performance (e.g., from the application performance database 120), deployment of and updates for the application (e.g., from the deployment database 122), and information on how the application(s) fit into the business taxonomy of the entity (e.g., from the service and capability taxonomy database). In addition, the application rating system 104 may gather information on a taxonomy of the business services performed by the entity system 102, a mapping of the business services to the platform(s), and the like for use in creating filters for the one or more applications.

After gathering the application data at block 502, the application rating system 104 evaluates factors indicating different aspects of a given application. To illustrate, as shown in FIG. 5, the application rating system 104 may evaluate one or more factors each indicating a level of stability of the application, starting with block 504, and evaluate one or more factors each indicating a level of resiliency of the application, starting with block 512. The application's stability may be considered the ability of the application to remain in continuous operation over time. The stability may also weigh how critical the application is to the platform of the entity system 102 and thus the larger effects to the platform should the application go out of operation, either temporarily or for a longer period of time. The application's resiliency may be considered the ability to prevent, detect, and recover from issues in the application's operation.

For example, in some embodiments, the application rating system 104 may evaluate one or more historical stability factors with respect to a given application, as indicated by block 504. Each historical stability factor may measure a level of the application's historical stability based on different aspects of the application and its operation, including past operation incidents for the application. Evaluating the one or more historical stability factors may include, for instance, determining a number of application operation incidents (e.g., incidents during which the application was inoperable), a percentage change in application operation incidents, a percentage of the application operation incidents that impacted the ability of the entity system 102 to carry out one or more functions (e.g., that impacted the ability of the entity system 102 to open, maintain, and administer accounts and technology resources), a percentage of the application operation incidents that impacted customers, and/or the like. In some cases, operation incidents may be classified into different types and/or different grades of severity. As such, the application rating system 104 may, as part of determining the number of application operation incidents, determine how many of each type and/or grade of operation incident occurred. As an illustration, the application rating system 104 may determine how many incidents of a highest grade of severity occurred in the past six months for an application (how many incidents of an intermediate grade of severity occurred in the past six months for the application, how many incidents of a lowest grade of severity occurred in the past thirty days for the application, and a percentage change in the number of lowest grade incidents compared to the previous thirty days.

In some embodiments, the application rating system 104 may also evaluate one or more criticality factors with respect to a given application, as indicated by block 506. Each criticality factor may measure a level of how important or critical the application is to other applications on the platform of the entity system 102, to the platform itself, to the functions performed by the platform, and the like. For instance, evaluating the one or more criticality factors may include determining an importance rating for the application, the number of open audit items for the application, whether the application is being used for compliance purposes, whether the application is critical to the platform of the entity system 102 and/or its underlying infrastructure, whether the application supports any critical functions performed by the entity system 102, how many functions are performed by the entity system 102 that the application supports, whether the application serves as a shared platform for other applications, whether the application uses confidential data, whether the application uses one or more products determined to potentially have a security issue, the ratings for vendors that produced products that are incorporated into the application, if any, and/or the like.

In some embodiments, the application rating system 104 may further evaluate one or more supportability factors with respect to a given application, as indicated by block 508. Each supportability factor may measure a level of how easy it is to provide technical support or solutions to issues with the application. Evaluating the one or more supportability factors may include determining how often the application is changed or updated (e.g., with a low rating for yearly changes, a medium rating for quarterly changes, and a high rating for monthly and above changes), whether the application uses one or more products that no longer have vendor support, a percentage of configuration drift in the application, a rating for the maturity of monitoring of the application, a rating for the effectiveness of monitoring of the application, and/or the like.

Additionally, the application rating system 104 may evaluate the resiliency of a given application starting with, in some embodiments, evaluating one or more incident prevention factors for a given application, as indicated by block 512. Each incident prevention factor may measure a level of how well an application operation incident can be prevented. Evaluating the one or more incident prevention factors may include determining the number of primary data centers used by the application, the number of all data centers used by the application, whether the application meets a minimum RTO standard, whether the application meets a minimum RPO standard, a metric representing server capacity for the application, a number of file system capacity alerts for the application, and/or the like.

In some embodiments, the application rating system 104 may also evaluate one or more incident detection factors for a given application, as indicated by block 514. Each incident detection factor may measure a level of how well or quickly an application operation incident can be detected. Evaluating the one or more incident detection factors may include determining whether and to what extent the health of the application's infrastructure is being monitored, whether the application has been recently monitored for operation incidents, whether functions carried out using the application have been recently monitored for operation incidents (e.g., incidents during which a resource transfer was unable to be successfully carried out), whether the application has anti-corruption measures, and/or the like.

In some embodiments, the application rating system 104 may further evaluate one or more incident recovery factors for a given application, as indicated by block 516. Each incident recovery factor may measure a level of how well an application can be recovered and returned to functionality after an application operation incident has occurred. Evaluating the one or more incident recovery factors may include determining the RTO for the application, the RPO for the application, the last RTO recovery test date, the last RPO restore test date, the availability of the application, the overall recovery strategy of the application, the deployment architecture for the application, how the application is being hosted (e.g., internally or by a third-party), to what extent the application has been onboarded, the frequency of data backups, the date of the last successful system backup for the application, the date of the last successful database backup for the application, the data corruption strategy for the application, the configuration data backup strategy for the application, and/or the like.

The application rating system 104 is further configured to determine scores for the application based on the evaluated factors. In some embodiments, as shown in FIG. 5, the application rating system 104 is configured to determine an overall stability score for a given application, as indicated by block 510, where the overall stability score measures the overall ability of the application to remain in continuous operation over time. The overall stability score for the application may be determined from the some or all of the evaluated stability factors, including the historical stability factor(s), criticality factor(s), and supportability factor(s). In some instances, the application rating system 104 may determine the overall stability score by determining, using the stability factors, whether the application meets a number of weighted stability criteria. More specifically, each weighted stability criterion may be associated with a weighted value, and the application rating system 104 may use the weighted values of the met stability criteria to generate the overall stability score.

As an illustration, the application rating system 104 may start by assigning a score of 100% to an application. The application rating system 104 may then determine, from the factors for the application, whether the application meets certain criteria for lowering the score from 100%. For example, the application rating system 104 may determine whether the application has had one or more highest grade incidents in the past six months and/or whether the application has had three or more intermediate grade incidents in the past six months. If the application has had one or more highest grade incidents in the past six months and/or three or more intermediate grade incidents in the past six months, the application rating system 104 may lower the score by a certain amount (e.g., by 25%). After making this determination and lowering the score if applicable, the application rating system 104 may continue to evaluate the remaining stability criteria and lower the score accordingly to produce the overall stability score. The overall stability score may also have a predetermined minimum score that cannot be exceeded, such as 0%. Other examples of stability criteria may include determining whether the application has had a certain number of lowest grade incidents in the past six months, whether the application uses a product that has been identified as been identified as having a potential security issue, whether the application has had a certain number of change-related incidents in the past six months, whether the application has experienced a certain amount of configuration drift, whether the application uses a product that is no longer supported by its vendor, and/or the like.

Additionally, in some embodiments, the application rating system 104 is configured to determine an overall resiliency score for a given application, as illustrated by block 518, where the overall resiliency score measures the ability of the application to prevent, detect, and recover from operation issues. The overall resiliency score may be determined from some or all of the resiliency factors, including the incident prevention factor(s), incident detection factor(s), and incident recovery factor(s). In some instances, similar to the overall stability score, the application rating system 104 may determine the overall resiliency score by determining, using the resiliency factors, whether the application meets a number of weighted resiliency criteria. More specifically, each weighted resiliency criterion may be associated with a weighted value, and the application rating system 104 may use the weighted values of the met resiliency criteria to generate the overall resiliency score.

As an illustration, similar to the overall stability score example provided above, the application rating system 104 may assign a score of 100% to an application and then lower the score from 100% up to a predetermined minimum score (e.g., 0%) based on the whether the application meets certain criteria. Examples of resiliency criteria may include determining the amount of data centers the application uses, along with the application's RTO (e.g., determining whether the application has an unrealistic recovery time objective based on it using too few data centers), the application's RTO along with the overall recovery strategy for the application (e.g., determining whether the application has an unrealistic recovery time objective based on it using a recovery strategy that is unlikely to recover the application within the objective time period), whether the application has an upcoming application recovery test due, whether the application has an upcoming data restoral test due, whether more than a certain percentage of the application's servers have hit critical capacity within the past thirty days, and/or the like.

In some embodiments, the application rating system 104 is configured to determine additional scores for the application, such as a criticality score and/or a data quality score, as indicated by blocks 520 and 522. The criticality score may measure overall how important or critical the application is to other applications on the platform(s) of the entity system 102, to a platform itself, to the functions performed by the platform(s), and the like. The data quality score may measure the overall quality of the data gathered and used by the application rating system 104 to generate the scores for the application, such as the overall stability score, the overall resiliency score, and the criticality score.

In some embodiments, as indicated by block 520, the application rating system 104 may determine the criticality score from a subset of the evaluated stability factors. More specifically, the application rating system 104 may determine the criticality score from the criticality factor(s) evaluated at block 506. Further, in some instances, similar to the overall stability score and the overall resiliency score, the application rating system 104 may determine the criticality score by determining, using the criticality factor(s), whether the application meets a number of weighted criticality criteria. Each weighted criticality criterion may be associated with a weighted value, and the application rating system 104 may use the weighted values of the met criticality criteria to generate the criticality score.

As an illustration, the application rating system 104 may assign a score of 0 to an application and raise the score based on whether the application meets certain criteria. Additionally, in some cases, the application rating system 104 may raise the criticality score up to a predetermined maximum score, such as 1 or 100. For example, the application rating system 104 may determine whether the application is used for compliance purposes. If the application is used for compliance purposes, the application rating system 104 may raise the criticality score up to the maximum amount (e.g., 1, 100). After making this determination and raising the score if applicable, the application rating system 104 may continue to evaluate the remaining criticality criteria and raise the score accordingly to produce the criticality score. Other examples of criticality criteria may include determining whether the application has a certain level of importance to the platform of the entity system 102, whether the application has a certain level of importance to the platform of the entity system 102, whether the application supports a certain number of critical functions performed by the entity system 102, whether the application impacts functions performed by employees of the entity system 102, whether the application impacts customers of the entity system 102, and/or the like.

Moreover, in some embodiments, as indicated by block 522, the application rating system 104 may determine the data quality score for the application from the evaluated stability factors and resiliency factors, such as from a sampling of the stability and resiliency factors. Further, in some instances, similar to the overall stability, overall resiliency, and criticality scores, the application rating system 104 may determine the data quality score by determining, using one or more stability and resiliency factors, whether the application meets a number of weighted data quality criteria. Each weighted data quality criterion may be associated with a weighted value, and the application rating system 104 may use the weighed values of the met data quality criteria to generate the data quality score.

To illustrate, similar to the examples for the overall stability score and overall resiliency score provided above, the application rating system 104 may assign a score of 100% to an application and then lower the score from 100% up to a predetermined minimum score (e.g., 0%) based on whether the application meets certain criteria. Examples of data quality criteria may include determining whether there is a mapping of the application to the platform(s) of the entity system 102 and/or functions performed by the entity system 102, whether there is a mismatch between the tendency for corruption of the application and the back-up strategy for the application, whether there is a discrepancy between how the application is hosted and the recovery strategy for the application, the count of data centers used by the application, whether a change frequency for the application is missing, whether there is a mismatch between the RPO for the application and the strategy for recovering the application from corruption, whether an RTO for the application is missing, whether a recovery strategy for the application is missing, whether an RPO for the back-up strategy of the application is missing, whether there is no RPO for databases used by the application, and/or the like.

It should be understood that the processes for determining the overall stability score, the overall resiliency score, the criticality score, and the data quality score discussed above are intended to be exemplary. Other processes may be used, such as by assigning a numerical value to evaluated factors for an application; for each factor, multiplying the numerical value by a weight associated with the factor; and summing the weighted numerical values. Additionally, it should be understood that the factors provided above are intended to be exemplary and that additional, alternative, or fewer factors may be used. Moreover, the overall stability, overall resiliency, criticality, and data quality factors may be determined from additional data sources not listed above, such as data sources on the resourcing and maintenance of the application.

Further, it should be understood that additional scores may be determined for a given application. For example, in some embodiments, the application rating system 104 may determine a supportability score for each application (e.g., from the supportability factor(s)), where the supportability score measures how easily the application can be supported and, potentially, how easily the application can be upgraded. As another example, in some embodiments, the application rating system 104 may determine a restoral score for each application (e.g., from the incident recovery factor(s)), where the restoral score measures how easily the application can be restored after an operation incident. As a third example, in some embodiments, the application rating system 104 may determine an uncertainty score for each application (e.g., from the criticality factor(s) and the supportability factor(s)), where the uncertainty score measures whether the application could potentially have or cause infrastructure issues in the future.

As indicated by block 524, after the overall stability score, overall resiliency score, criticality score, and data quality score have been determined for a given application, the application rating system 104 may present these scores to a user. Presenting the scores may include, for example, generating interactable GUIs that the user may manipulate to see the scores, as well as additional information about a given application. In some cases, the application rating system 104 may present the scores for the application by itself, such as in response to the user selecting the application on a GUI presented to the user. In other cases, the application rating system 104 may present the scores for the application in aggregate with scores for other applications in the application database 108 that the application rating system 104 has scored. For instance, the user may select some or all of the applications using a graphical widget on a GUI, and the application rating system 104 may generate a second GUI presenting the aggregated scores of the selected applications. In some cases, these aggregated scores may include the mean or median scores of the selected applications (e.g., mean or median overall stability scores, mean or median overall resiliency scores, mean or median criticality scores, and mean or median data quality scores for the selected applications). The GUIs may also present additional information about the selected applications, such as information on the factors of the applications. The factor information may include mean or median factor information for the selected applications, a range of factor information for the selected applications, a sum of factor information for the selected applications, and/or a combination of the foregoing, depending on which factors are presented to the user in the GUI.

As an illustration, the high-level process flow 600 of FIG. 6 demonstrates generating GUIs used to present application scores, in accordance with some embodiments of the invention. As indicated by block 602, the application rating system 104 may generate a first GUI for presenting aggregated application information. For example, the first GUI may include the aggregated scores for all of the applications stored in the application database 108 or for a portion of the applications stored in the application database 108, such as a portion of the applications the user selected during a previous session of viewing the aggregated application information (e.g., using filters presented by the GUI). The first GUI may further include a number of filters that the user can select to narrow the list of applications, such as filters based on the functions performed by a given application, what platform the application is operating on, how the application is hosted, a division of the entity that developed the application, and/or the like. For example, the application rating system 104 may determine these filters from the information gathered from the service and capability taxonomy database 124, including the information on the business taxonomy and functions performed by the entity system 102.

As indicated by block 604, the application rating system 104 receives a filter selection from the user. For instance, the user may select one or more filters provided on the first GUI. In response to the filter selection, the application rating system 104 may identify a subset of the applications stored in the application database 108 based on the selected filter (s), as indicated by block 606. To illustrate, the application rating system 104 may use metadata for the applications and/or the evaluated factors (e.g., stability and resiliency factors) to determine whether a given application meets one or more criteria associated with each selected filter and identify the subset of applications that meet all of the filter criteria.

As indicated by block 608, the application rating system 104 generates a second GUI presenting aggregated application information, such as aggregated application scores, for the subset of applications. In some instances, the user may be able to narrow the list of presented applications further by selecting additional filters or criteria. The user may also be able to view a list of the subset of applications and select an individual application from the list in order to view, for example, the overall stability score, overall resiliency score, criticality score, and data quality score for just the selected application.

FIG. 7 illustrates a representation of a GUI 700 for display on a user device (e.g., the user device 106), in accordance with some embodiments of the invention. As shown in FIG. 7, the exemplary GUI 700 includes a first section 702 that includes filters the user can use to narrow the list of applications displayed on the GUI 700. For example, as shown, the selectable filters may include filters based on the capability framework of the entity system 102 and the platform(s) operated by the entity system 102, on aspects of the applications themselves, on services or functions performed by the applications or facilitated by the applications, and/or the like. As discussed above, once the application rating system 104 receives a filter selection, the application rating system 104 may identify the subset of applications that the filters apply to, determine aggregated application information for the subset, and display the aggregated application information in a modified GUI.

As such, the GUI 700 displays aggregated information for the filtered applications in a second section 704. In the example of the GUI 700, the second section 704 includes a first subsection 706 providing aggregated application information for different groups within a selected filter (e.g., the selected "Category 1" filter within the "Capability Framework" dropdown menu). As shown in FIG. 7, the first subsection 706 provides an application count, an aggregated criticality score, an aggregated criticality rating (e.g., an indication of whether the aggregated criticality score is low, medium, or high), an aggregated data quality score, an aggregated overall stability score, and an aggregated overall resiliency score for each of a number of groups within the selected "Category 1" filter.

The second section 704 also includes a second subsection 708 providing aggregated application information for another selected filter. In the example of the GUI 700, FIG. 7 illustrates the second subsection 708 providing an application count, along with a number of other aggregated evaluated stability and resiliency factors, for applications identified using "Filter 4" from the "Service Framework" dropdown menu of filters in the first section 702. It should be understood that the aggregated evaluated stability and resiliency factors shown in FIG. 7 are intended to be exemplary and that additional, fewer, and/or alternate factors may be used in other embodiments, such as a breakdown of different operation incident types or severities for the subset of applications.

The second subsection 708 may further include one or more graphical indicators of the aggregated application information for the subset of applications. For example, as shown in FIG. 7, the second subsection 708 may include an indication of the aggregated criticality score for the selected subset of applications, next to a series of three meters that show the aggregated data quality score, the aggregated stability score, and the aggregated resiliency score for the subset of applications. Each meter resembles a dial indicating the level of the aggregated score relative to the highest and lowest possible scores (e.g., 100% and 0%, respectively). Each meter may also include cutoff lines that provide a measure of "how good" the aggregated score is. For instance, an aggregated score between 91% and 100% inclusive may be considered a "good" score such that a first cutoff line is placed at 91% on the meter. Similarly, an aggregated score between 81% and 90% inclusive may be considered a "fair" score, with any aggregated score below 81% being considered a "poor" score, such that a second cutoff line is placed at 81% on the meter. In this way, a user can tell how "good" the aggregated score is by seeing how the aggregated score places with respect to the cutoff lines. In some cases, the different sections of the meter may also be colored to show the user how good the aggregated score is. For example, the "poor" section of the meter may be colored red, the "fair" section of the meter may be colored yellow, and the "good" section of the meter may be colored green.

Additionally, the second section 704 may include a third subsection 710, which is further shown in FIG. 8. The third subsection 710 shows trends of the subset of applications. The trends may be presented in written and/or graphical form. For example, in the GUI 700 shown in FIG. 8, the third subsection 710 includes a first graph 712 that illustrates aggregated operation incidents (e.g., average operation incidents per application or total operation incidents for the entire subset) for the selected subsection of applications over a period of time, such as a rolling twelve-month period. The first graph 712 may also separately chart incidents of different types, such as three different types in FIG. 8.

As another example, the third subsection 710 may also include a second graph 714 charting the overall stability and resiliency scores of the subset of applications relative to each other. As shown in FIG. 8, the second graph 714 charts the number (e.g., both in absolute number and percentage) of the subset of applications with low overall stability scores and low overall resiliency scores (e.g., with a "low" stability score being an overall stability score less than 60% and a "low" resiliency score being an overall resiliency score less than 80%), the number of the subset of applications with low overall stability scores and high overall resiliency scores, the number of the subset of applications with high overall stability scores and low overall resiliency scores, and the number of the subset of applications with high overall stability scores and high overall resiliency scores. In some cases, each charted portion may be selectable such that the user may be able to click on, for instance, the circle representing the portion of applications with low overall stability and resiliency scores. Doing this may bring up a pop-up list showing the selected portion of applications.

The GUI 700 further includes a third section 716 that provides information on the individual applications in the selected subset. As shown in FIG. 8, the third section 716 may include selectable tabs, where selecting a first tab 718 brings up a list with an entry for each application in the selected subset, where each entry includes information about the associated application. As an illustration, as shown in FIG. 8, the first tab 718 may list the technical executive responsible for the application, the application technical executive responsible for the application, the number assigned to the application, the full name of the application, and how the application is hosted (e.g., internal v. external to the entity system 102), as well as the scores for the application and various evaluated factors for the application. The user may be able to scroll to see additional information for the applications, as shown in FIG. 9. For example, by scrolling to the right, as shown in FIG. 9, the user may be able to view the historical stability factor(s), the criticality factor(s), the supportability factor(s), the incident prevention factor(s), the incident detection factor(s), and the incident recovery factor(s). The user may also be able to export the data for one or more applications shown in the list (e.g., by selecting the "Export" button), with varying levels and types of detail.

Additionally, at least some of the information for the application may be selectable in the GUI. For instance, the underlined number in the "Application Insights" column may be selectable. FIG. 10 illustrates a representation of a GUI 800 for display on a user device (e.g., the user device 106), in accordance with some embodiments of the invention. As an example, the GUI 800 may be generated by the application rating system 104 and displayed on the user device 106 in response to the user selecting the Application Insights number for a given application. The GUI 800 includes a header 802 showing the number assigned to the selected application, as well as a breakdown 804 of the scores for the selected application. More specifically, as shown, the breakdown 804 may include a list of each weighted criterion that the application meets (e.g., each weighted stability criterion, resiliency criterion, criticality criterion, and data quality criterion met), where the weighted criteria are used to generate the scores for the application. The breakdown 804 also includes a definition of each criterion, an explanation of what each criterion tests for, and the weight of each criterion.

Finally, the breakdown 804 includes a list of insights for the met criteria, where the insights include recommended actions for improving the scores for the application. Examples of recommended actions may include assessing the criticality scoring and the RTO recovery requirements for the application to ensure that both are consistent with expectations of the supported functions of the application, removing products from the application that have been determined to potentially pose a security issue, updating servers to establish a new configuration baseline, removing products from the application that are out of vendor support, and/or the like. In some cases, no recommended action may be provided for the criterion, such as where the criterion is measuring the criticality of the application, and the importance of the application to a platform of the entity system 102 cannot be changed.

FIG. 11 illustrates the GUI 700 where a second tab 720 has been selected, in accordance with some embodiments of the invention. As shown, selecting the second tab may provide a list of the platforms that are operated by the entity system 102 and on which at least some of the selected subset of applications are deployed. In some cases, the list may also include any platforms or architecture operated by a third-party system and that are used by at least one of the selected subset of applications. The list may further provide information about different levels or aspects of the platforms, such as the architecture domain relating to a given platform and how the platform functions (e.g., digitally). In addition, the list may include the number of applications from the selected subset that operating on each platform, as well as the aggregated criticality score, aggregated criticality rating, aggregated data quality score, aggregated stability score, and aggregated resiliency score for the applications operating on the platform.

FIG. 12 illustrates the GUI 700 where a third tab 722 has been selected, in accordance with some embodiments of the invention. As illustrated in FIG. 12, selecting the third tab 722 may provide a list of the aggregated insights for the selected subset of applications. More specifically, the third tab 722 may list each weighted criterion met by at least one application, where the weighted criteria are used to generate the scores for the applications; an explanation of what each criterion tests for; and a recommended action associated with the criterion. Further, the third tab 722 may include the number of applications that meet the criterion and are associated with the recommended action. In some cases, the number of applications may be selectable. Selecting a number may redirect the user to another GUI or bring up a pop-up box that lists each application that met the criterion, as well as additional information about each application.

It should be understood that GUIs 700 and 800 illustrated in FIGS. 7-12 are intended to be exemplary. Additional and alternate GUIs may be generated by the application rating system 104 and displayed to a user to present information about the applications and their scores. For example, in some embodiments, the GUIs generated by the application rating system 104 may link to documentation about the GUIs and the processes used to generate the scores. This may help the user understand the information the user is viewing on the GUIs. The linked documentation GUI may also include information on how to use the GUIs (e.g., how to use the selectable filters and selectable tabs), how to navigate the GUIs, what the application insights are, and/or the like. As another example, in some embodiments, the GUIs generated by the application rating system 104 may include additional application scores and/or application factors. In some cases, the GUIs may also include additional graphical widgets used to show the additional application scores and/or application factors. To illustrate, a GUI generated by the application rating system 104 may include supportability, restoral, and/or uncertainty scores for the applications, along with additional meters demonstrating the supportability, restoral, and/or uncertainty scores.

In addition to the uses discussed above, the overall stability, overall reliability, criticality, and data quality scores for the applications stored in the application database 108, as well as the stability and resiliency factors and, in some cases, additional information gathered from the data source(s) 100, can be used to improve the operation of the applications. For example, the application rating system 104 may use the overall stability scores, overall reliability scores, criticality scores, and the stability and reliability factors to identify applications with recoverability issues in the event of data center outages. For example, the application rating system 104 may identify that an application has an objective of recovering in one hour in case of an operation outage but a recovery strategy of rebuilding from a back-up, which would likely take more than one hour. The application rating system 104 may also identify target applications that should never be out of operation, prioritize remediation and upgrade activities, identify applications in greatest need of cybersecurity or resiliency measures, and provide an independent view of criticality and potential issues not available from other sources. The application rating system 104 may also use the data quality scores to identify additional data sources that would help the application rating system 104 refine the scoring process, as well as instances where applications are missing key data, such as a recovery plan.

Furthermore, in addition to presenting the user with the scores for various applications and providing recommended actions for improving the scores of the applications, in some embodiments, the application rating system 104 may use the application scores and their underlying factors to predict and address operation issues before they occur. For example, the application rating system 104 may apply machine-learning to the information gathered from the data source(s) 110 to predict application and/or platform failures from human error and change, from system component failure, and/or the like. This may include, for instance, analyzing historical operation incidents to identify incidents caused by human errors or by system errors. This may also include identifying how the application was brought back into operation after an operation incident and how difficult it was to bring the application back into operation. As an illustration, the application rating system 104 may identify where an engineer had to manually perform one or more actions in order to bring the application back into operation. The application rating system 104 may also identify supportability gaps in applications (e.g., based on the supportability factors for various applications and the underlying data used to evaluate the supportability factors).

By predicting, for example, operation incidents and supportability gaps, the application rating system 104 may address operation issues and/or alert build engineers of operation issues before they occur. For example, the application rating system 104 may alert a build engineer that a given application has a predicted failure occurring within a certain timeline with a calculated level of certainty. This may help build engineers proactively replace system hardware, perform application upgrades or patches, and the like in order to more fully maintain continuous operation of the application and the platform(s) of the entity system 102.

Additionally, in some embodiments, the GUIs generated by the application rating system 104 may include the predicted operation issues. For example, when a user selects a filter and thereby narrows the subset of applications with information shown, the updated GUI may include a number and/or type of predicted operation incidents for the filtered application(s). In this way, a user may be able to view, for instance, predicted operation issues by platform or platform type.

In some cases, the application rating system 104 may also chart the historical trends of the overall stability and resiliency scores for a given application to identify movement of applications and platforms over time. This may allow the application rating system 104 to, for example, identify applications that need to be addressed because of configuration drift, supportability issues, and so on. These charts may also be shown to users by the GUIs generated by the application rating system 104.

In some cases, the application rating system 104 may also aggregated the predicted operation issues for the applications by business function. To illustrate, the application rating system 104 may use the scores and the data gathered from the data source(s) 110 to predict the impact of the applications on the end functions of the entity system 102 by using the factors relating to the RTO, back-up strategies, corruption strategies, and the like to determine how many resource transfers of a certain number will succeed versus fail (e.g., if customers attempt to carry out 35 million resource transfers, what number or percentage of those will fail due to application issues). In this way, the application rating system 104 may predict operation issues by business function performed by the entity system 102. As an example, the application rating system 104 may predict operation issues relating to performing resource transfers, opening new accounts, identifying potential customers for the entity, and the like. A user may be able to view the predicted operation issues by business function by, for instance, selecting filters isolating the business function on a GUI generated by the application rating system 104, in response to which the application rating system 104 generates an updated GUI that includes the predicted operation issues by business function. Further, in some cases, the application rating system 104 may alert users associated with a business function if the predicted operation issues include a certain type of issue and/or reach a certain threshold of issues so that actions may be taken to repair the underlying applications before there is a disruption in providing the function. The application rating system 104 may also use the information gathered from the data source(s) 110 to build a capability map of how the applications relate to the end functions performed by the entity system 102 (e.g., to the customer-facing actions performed by the entity system 102).

In some embodiments, the application rating system 104 may periodically re-generate the scores for the one or more applications stored in the application database 108 and compare the new scores to the old scores for the application(s). If a score for a given application has dropped, for example, by a certain percentage or below a certain threshold, the application rating system 104 may transmit an alert of the score drop to the users in charge of the application. In some cases, the application rating system 104 may determine and transmit the reasons for the score drop, as well. This may also help ensure continuous operation of applications by alerting build engineers of issues in applications that they may not have been aware of. Further, the application rating system 104 may take into account issues in the degradation of the data for an application when generating the updated scores. For instance, the application rating system 104 may lower a resiliency score if a certain amount of time has passed since the application was last tested for resiliency, and the application rating system 104 may indicate this in the alert to the user. Further, in some cases, the application rating system 104 may be able to identify budget errors from the application scores and their underlying data, as well as identify additional data and data sources that would be beneficial for evaluating the applications stored in the application database 108.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These one or more computer-executable program code portions may be provided to a processor of a special purpose computer for the continuous authentication and encryption processes and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive of, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A system for determining platform stability and resiliency, the system comprising:
 a memory device with computer-readable program code stored thereon;
 a communication device; and
 a processing device operatively coupled to the memory device and communication device, wherein the processing device is configured to execute the computer-readable program code to:
  for each of a plurality of applications deployed or scheduled to be deployed on a platform that is configured to perform a plurality of functions:
   gather data relating to the application and operation of the application on the platform;
   evaluate one or more factors each indicating a level of stability of the application;
   evaluate one or more factors each indicating a level of resiliency of the application;
   determine an overall stability score for the application from the one or more stability factors and an overall resiliency score for the application from the one or more resiliency factors; and
   determine a data quality score and a criticality score for the application from the one or more stability factors and the one or more resiliency factors, wherein the data quality score measures a quality of the gathered data and the criticality score measures an importance of the application to the plurality of functions of the platform;
  generate a first graphical user interface including a plurality of selectable filters;
  receive a selection of at least one filter;
  identify a subset of the plurality of applications using the selected at least one filter;

determine an aggregated stability score, an aggregated resiliency score, an aggregated data quality score, and an aggregated criticality score for the identified subset from the overall stability scores, overall resiliency scores, data quality scores, and criticality scores for the identified subset of applications; and generate a second graphical user interface including the aggregated stability score, aggregated resiliency score, aggregated data quality score, and aggregated criticality score.

2. The system of claim 1, wherein the second graphical user interface further includes a list with an entry for each application of the identified subset, the entry for a given application including the overall stability score, overall resiliency score, data quality score, and criticality score for the application, and wherein the processing device is further configured to:

receive a selection of an application from the list; and
generate a third graphical user interface including:
a breakdown of at least one of the overall stability score, overall resiliency score, data quality score, or criticality score for the selected application; and
one or more recommended actions for improving at least one of the overall stability score, overall resiliency score, data quality score, or criticality score for the selected application.

3. The system of claim 1, wherein the processing device is further configured to evaluate the one or more stability factors by:

evaluating one or more factors each indicating a level of historical stability of the application based on past operation incidents for the application;
evaluating one or more factors each indicating a level of criticality of the application to the plurality of functions of the platform; and
evaluating one or more factors each indicating a level of supportability of the application.

4. The system of claim 1, wherein the processing device is further configured to evaluate the one or more resiliency factors by:

evaluating one or more factors each indicating a level of ability for operation incident prevention for the application;
evaluating one or more factors each indicating a level of ability for operation incident detection for the application; and
evaluating one or more factors each indicating a level of ability for operation incident recovery for the application.

5. The system of claim 1, wherein the processing device is further configured to:

determine the overall stability score by determining, using the one or more stability factors, whether the application meets each of a plurality of stability criteria, wherein each stability criterion is associated with a weighted value, and using the weighted values of the met stability criteria to generate the overall stability score;
determine the overall resiliency score by determining, using the one or more resiliency factors, whether the application meets each of a plurality of resiliency criteria, wherein each resiliency criterion is associated with a weighted value, and using the weighted values of the met resiliency criteria to generate the overall resiliency score;
determine the data quality score by determining, using the one or more stability factors and the one or more resiliency factors, whether the application meets each of a plurality of data quality criteria, wherein each data quality criterion is associated with a weighted value, and using the weighted values of the met data quality criteria to generate the data quality score; and
determine the criticality score by determining, using the one or more stability factors and the one or more resiliency factors, whether the application meets each of a plurality of criticality criteria, wherein each criticality criterion is associated with a weighted value, and using the weighted values of the met criticality criteria to generate the criticality score.

6. The system of claim 5, wherein the processing device is further configured to:

receive a selection of one of the plurality of applications; and
generate a fourth graphical user interface including:
the met stability criteria, the met resiliency criteria, the met data quality criteria, and the met criticality criteria; and
one or more recommended actions for improving at least one of the overall stability score, overall resiliency score, data quality score, or criticality score based on at least one of the met stability criteria, met resiliency criteria, met data quality criteria, or met criticality criteria.

7. The system of claim 1, wherein the aggregated stability score is a mean or a median of the total overall stability scores for the identified subset of applications;

wherein the aggregated resiliency score is a mean or a median of the total overall resiliency scores for the identified subset of applications;
wherein the aggregated data quality score is a mean or a median of the total data quality scores for the identified subset of applications; and
wherein the aggregated data quality score is a mean or a median of the total criticality scores for the identified subset of applications.

8. The system of claim 1, wherein the second graphical user interface further includes a first meter showing a strength of the aggregated stability score compared to a total possible stability score, a second meter showing a strength of an aggregated resiliency score compared to a total possible resiliency score, and a third meter showing a strength of the data quality score compared to a total possible data quality score.

9. The system of claim 1, wherein the second graphical user interface further includes a graph charting aggregated operation incidents for the identified subset of applications over a period of time.

10. The system of claim 1, wherein the second graphical user interface further includes a graph charting a portion of the identified subset of applications with low overall stability scores and low overall resiliency scores, a portion of the identified subset of applications with low overall stability scores and high overall resiliency scores, a portion of the identified subset of applications with high overall stability scores and low overall resiliency scores, and a portion of the identified subset of applications with high overall stability scores and high overall resiliency scores.

11. The system of claim 1, wherein the processing device is further configured to predict a future operation failure for an application of the plurality of applications from the one or more stability factors and one or more resiliency factors for the application.

12. The system of claim 1, wherein the processing device is further configured to predict a future supportability issue for an application of the plurality of applications from the one or more stability factors for the application.

13. A computer-implemented method for determining platform stability and resiliency, the method comprising:
for each of a plurality of applications deployed or scheduled to be deployed on a platform, wherein the platform that is configured to perform a plurality of functions:
gathering data relating to the application and operation of the application on the platform;
evaluating one or more factors each indicating a level of stability of the application;
evaluating one or more factors each indicating a level of resiliency of the application;
determining an overall stability score for the application from the one or more stability factors and an overall resiliency score for the application from the one or more resiliency factors; and
determining a data quality score and a criticality score for the application from the one or more stability factors and the one or more resiliency factors, wherein the data quality score measures a quality of the gathered data and the criticality score measures an importance of the application to the plurality of functions of the platform;
generating a first graphical user interface including a plurality of selectable filters;
receiving a selection of at least one filter;
identifying a subset of the plurality of applications using the selected at least one filter;
determining an aggregated stability score, an aggregated resiliency score, an aggregated data quality score, and an aggregated criticality score for the identified subset from the overall stability scores, overall resiliency scores, data quality scores, and criticality scores for the identified subset of applications; and
generating a second graphical user interface including the aggregated stability score, aggregated resiliency score, aggregated data quality score, and aggregated criticality score.

14. The computer-implemented method of claim 13, wherein the second graphical user interface further includes a list with an entry for each application of the identified subset, the entry for a given application including the overall stability score, overall resiliency score, data quality score, and criticality score for the application, and wherein the method further comprises:
receiving a selection of an application from the list; and
generating a third graphical user interface including:
a breakdown of at least one of the overall stability score, overall resiliency score, data quality score, or criticality score for the selected application; and
one or more recommended actions for improving at least one of the overall stability score, overall resiliency score, data quality score, or criticality score for the selected application.

15. The computer-implemented method of claim 13, wherein determining the overall stability score comprises determining, using the one or more stability factors, whether the application meets each of a plurality of stability criteria, wherein each stability criterion is associated with a weighted value, and using the weighted values of the met stability criteria to generate the overall stability score;
wherein determining the overall resiliency score comprises determining, using the one or more resiliency factors, whether the application meets each of a plurality of resiliency criteria, wherein each resiliency criterion is associated with a weighted value, and using the weighted values of the met resiliency criteria to generate the overall resiliency score;
wherein determining the data quality score comprises determining, using the one or more stability factors and the one or more resiliency factors, whether the application meets each of a plurality of data quality criteria, wherein each data quality criterion is associated with a weighted value, and using the weighted values of the met data quality criteria to generate the data quality score; and
wherein determining the criticality score comprises determining, using the one or more stability factors and the one or more resiliency factors, whether the application meets each of a plurality of criticality criteria, wherein each criticality criterion is associated with a weighted value, and using the weighted values of the met criteria to generate the criticality score.

16. The computer-implemented method of claim 15, further comprising:
receiving a selection of one of the plurality of applications; and
generating a fourth graphical user interface including:
the met criteria, the met resiliency criteria, the met data quality criteria, and the met criticality criteria; and
one or more recommended actions for improving at least one of the overall stability score, overall resiliency score, data quality score, or criticality score based on at least one of the met stability criteria, met resiliency criteria, met data quality criteria, or met criticality criteria.

17. The computer-implemented method of claim 13, wherein the second graphical user interface further includes a graph charting aggregated operation incidents for the identified subset of applications over a period of time.

18. The computer-implemented method of claim 13, wherein the second graphical user interface further includes a graph charting a portion of the identified subset of applications with low overall stability scores and low overall resiliency scores, a portion of the identified subset of applications with low overall stability scores and high overall resiliency scores, a portion of the identified subset of applications with high overall stability scores and low overall resiliency scores, and a portion of the identified subset of applications with high overall stability scores and high overall resiliency scores.

19. The computer-implemented method of claim 13, further comprising:
predicting a future operation failure for an application of the plurality of applications from the one or more stability factors and one or more resiliency factors for the application; and
predicting a future supportability issue for an application of the plurality of applications from the one or more stability factors for the application.

20. A computer program product for determining platform stability and resiliency with at least one non-transitory computer-readable medium having computer-readable program code portions embodied therein, the computer-readable program code portions comprising:
an executable portion configured for, for each of a plurality of applications deployed or scheduled to be deployed on a platform that is configured to perform a plurality of functions:
gathering data relating to the application and operation of the application on the platform;
evaluating one or more factors each indicating a level of stability of the application;

evaluating one or more factors each indicating a level of resiliency of the application;

determining an overall stability score for the application from the one or more stability factors and an overall resiliency score for the application from the one or more resiliency factors; and determining a data quality score and a criticality score for the application from the one or more stability factors and the one or more resiliency factors, wherein the data quality score measures a quality of the gathered data and the criticality score measures an importance of the application to the plurality of functions of the network;

an executable portion configured for generating a first graphical user interface including a plurality of selectable filters;

an executable portion configured for receiving a selection of at least one filter;

an executable portion configured for identifying a subset of the plurality of applications using the selected at least one filter;

an executable portion configured for determining an aggregated stability score, an aggregated resiliency score, an aggregated data quality score, and an aggregated criticality score for the identifies subset from the overall stability scores, overall resiliency scores, data quality scores, and criticality scores for the identified subset of applications; and an executable portion configured for generating a second graphical user interface including the aggregated stability score, aggregated resiliency score, aggregated data quality score, and aggregated criticality score.

* * * * *